US012802893B2

(12) United States Patent
Yoshikawa et al.

(10) Patent No.: US 12,802,893 B2
(45) Date of Patent: Nov. 17, 2026

(54) CAPACITOR ARRAY

(71) Applicant: Murata Manufacturing Co., Ltd., Nagaokakyo (JP)

(72) Inventors: Masanori Yoshikawa, Nagaokakyo (JP); Hiroshi Kikuchi, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 142 days.

(21) Appl. No.: 18/957,140

(22) Filed: Nov. 22, 2024

(65) Prior Publication Data

US 2025/0087430 A1 Mar. 13, 2025

Related U.S. Application Data

(63) Continuation of application No. PCT/JP2023/019514, filed on May 25, 2023.

(30) Foreign Application Priority Data

Jun. 1, 2022 (JP) ................................ 2022-089629

(51) Int. Cl.
*H01G 9/26* (2006.01)
*H01G 9/048* (2006.01)
*H01G 9/10* (2006.01)

(52) U.S. Cl.
CPC ................ *H01G 9/26* (2013.01); *H01G 9/10* (2013.01); *H01G 9/048* (2013.01)

(58) Field of Classification Search
CPC .......... H01G 9/012; H01G 9/048; H01G 9/08; H01G 9/10; H01G 9/15; H01G 9/26
See application file for complete search history.

(56) References Cited

U.S. PATENT DOCUMENTS 11,769,705 B2 9/2023 Matsuura et al.
2015/0382471 A1* 12/2015 Furutani .............. H05K 1/0296 29/841

(Continued)

FOREIGN PATENT DOCUMENTS

JP 2009-141143 A 6/2009
JP 2010-171304 A 8/2010

(Continued)

OTHER PUBLICATIONS

International Search Report received for PCT Patent Application No. PCT/JP2023/019514, mailed on Aug. 15, 2023, 2 pages (English Translation Only).

*Primary Examiner* — Nathan Milakovich
(74) *Attorney, Agent, or Firm* — ArentFox Schiff LLP

(57) ABSTRACT

A capacitor array that includes: a capacitor layer including a plurality of capacitor elements; a first through slit extending in a first direction and arranged in a plane direction orthogonal to a thickness direction; and a second through slit extending in a second direction intersecting the first direction and arranged in the plane direction orthogonal to the thickness direction, wherein the first through slit and the second through slit separate the plurality of capacitor elements from each other, and when an intersection region of the first through slit and the second through slit is viewed in the thickness direction, intersection points of a first imaginary slit obtained by extending the first through slit to the intersection region and a second imaginary slit obtained by extending the second through slit to the intersection region are located inside the intersection region.

18 Claims, 18 Drawing Sheets

(56) References Cited

U.S. PATENT DOCUMENTS

| | | | | |
|---|---|---|---|---|
| 2020/0312576 | A1* | 10/2020 | Furukawa | H01G 9/26 |
| 2021/0143074 | A1 | 5/2021 | Matsuura et al. | |

FOREIGN PATENT DOCUMENTS

| | | | |
|---|---|---|---|
| JP | 2020-167361 | A | 10/2020 |
| JP | 2021-077749 | A | 5/2021 |

* cited by examiner

FIG. 14A - Comparative Example
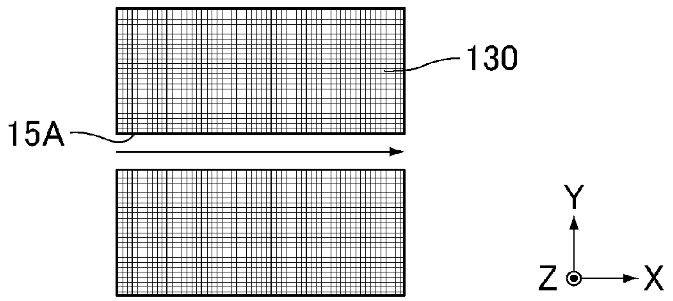
FIG. 14B - Comparative Example
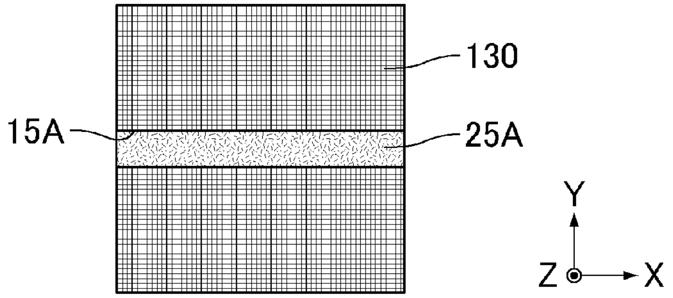
FIG. 14C - Comparative Example
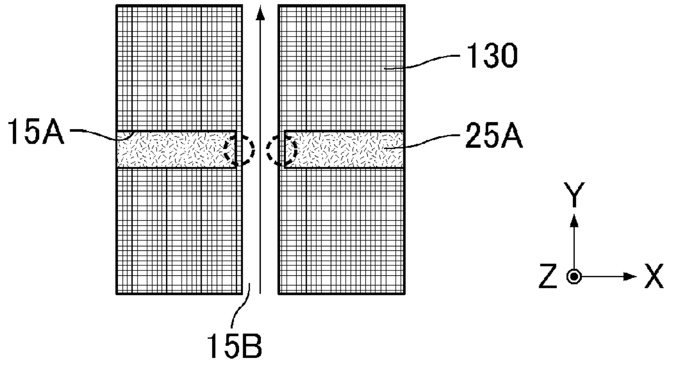

FIG. 15 - Comparative Example
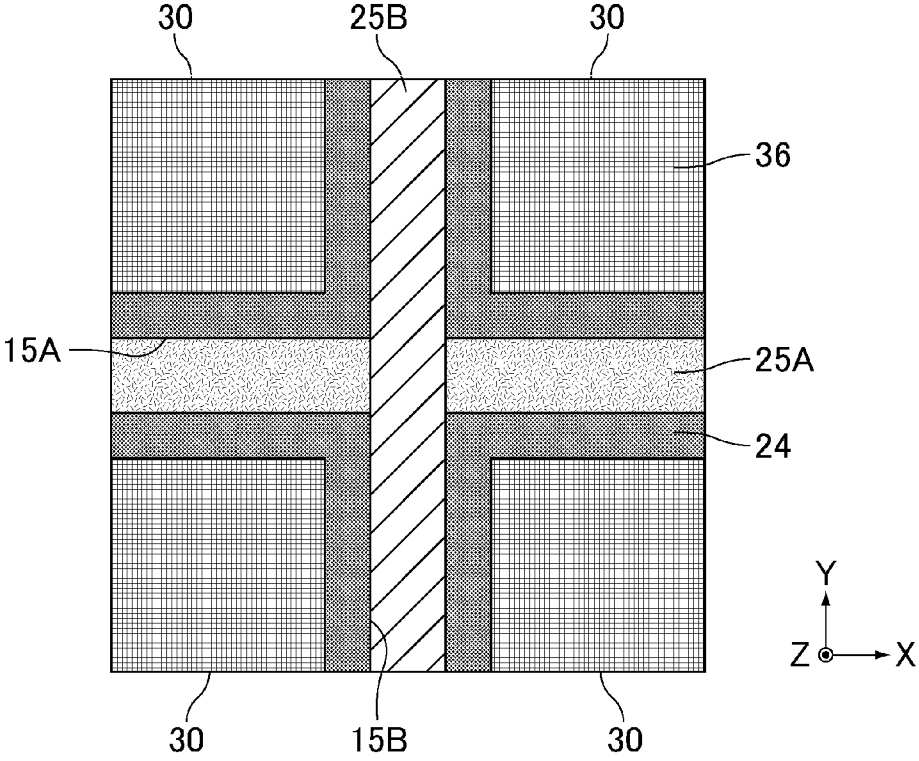

CAPACITOR ARRAY

CROSS REFERENCE TO RELATED APPLICATIONS

The present application is a continuation of International application No. PCT/JP2023/019514, filed May 25, 2023, which claims priority to Japanese Patent Application No. 2022-089629, filed Jun. 1, 2022, the entire contents of each of which are incorporated herein by reference.

TECHNICAL FIELD

The present disclosure relates to a capacitor array.

BACKGROUND ART

Recently, use of a capacitor array including capacitor elements two-dimensionally arranged is being studied as a substrate for mounting electronic components.

As a method of manufacturing a capacitor array, Patent Document 1 discloses a method of manufacturing a component-embedded substrate. In the method, before solid electrolytic capacitors are formed on an aluminum etched foil sheet, grooves for separation and division are formed in one surface of the aluminum etched foil by dry mechanical processing using a laser device, a die, or the like. In addition, a protective insulating material, also serving as a sheet reinforcement member, is formed on the same surface, and then, the solid electrolytic capacitors are formed. Next, the bottom surface of the aluminum etched foil is removed until the bottom portions of the grooves are exposed, so that the solid electrolytic capacitors and wiring patterns electrically separated are formed on the aluminum etched foil sheet.

Patent Document 1: Japanese Unexamined Patent Application Publication No. 2010-171304

SUMMARY OF THE DISCLOSURE

In the method described in Patent Document 1, the grooves for separation and division and the protective insulating material are formed on one surface of an aluminum etched foil. Hence, the obtained component-embedded substrate has an asymmetric front-back structure, which tends to cause a warp. In addition, in the case in which the grooves for separation and division are formed to intersect one another, the warp mentioned above tends to cause stress concentration at the intersection points of the grooves, and the stress concentration is likely to cause separation (delamination) between materials.

To address this, the inventors of the present disclosure conceived an idea of manufacturing a capacitor array having a symmetric front-back structure.

However, for example, in the case of forming first through slits and second through slits that intersect one another to divide one capacitor sheet into capacitor elements, if a metal scrap (for example, an aluminum scrap) generated when the capacitor sheet is divided is attached to span an intersection region of a first through slit and a second through slit, there is a possibility that a short circuit occurs between adjacent capacitor elements.

An object of the present disclosure is to provide a capacitor array that includes capacitor elements separated by through slits intersecting one another and in which short circuit defects that are likely to occur between adjacent capacitor elements are reduced.

A capacitor array of the present disclosure includes: a capacitor layer including a plurality of capacitor elements, each of the plurality of capacitor elements includes a first electrode layer, a second electrode layer, and a dielectric layer, the first electrode layer and the second electrode layer facing each other in the thickness direction with the dielectric layer interposed therebetween; a first through slit extending in a first direction and arranged in a plane direction orthogonal to a thickness direction; and a second through slit extending in a second direction intersecting the first direction and arranged in the plane direction orthogonal to the thickness direction, wherein the first through slit and the second through slit separate the plurality of capacitor elements from each other, and when an intersection region of the first through slit and the second through slit is viewed in the thickness direction, intersection points of a first imaginary slit obtained by extending the first through slit to the intersection region and a second imaginary slit obtained by extending the second through slit to the intersection region are located inside the intersection region.

With the present disclosure, it is possible to provide a capacitor array that includes capacitor elements separated by through slits intersecting one another and in which short circuit defects that may occur between adjacent capacitor elements are reduced.

BRIEF DESCRIPTION OF THE DRAWINGS

FIGS. 14A, 14B, and 14C are schematic plan diagrams illustrating an example of a cutting step for a capacitor sheet according to a comparative example outside the scope of the present disclosure.

FIG. 15 is a schematic plan view of the example of the capacitor array according to the comparative example.

DESCRIPTION OF THE PREFERRED EMBODIMENTS

Hereinafter, a capacitor array of the present disclosure will be described. The present disclosure is not limited to the following configurations, which may be changed as appropriate within a range not changing the spirit of the present disclosure. Combinations of two or more individual preferred configurations described in the following are also included in the present disclosure.

In the present specification, the terms indicating the relationships of components (for example, "perpendicular", "parallel", "orthogonal", and the like) and the terms indicating the shapes of components are not expressions in a strict sense but expressions including substantially equivalent ranges, for example, ranges including differences of several percent.

The drawings described in the following are schematic, and hence, the dimensions, the scale of the ratio of longitudinal dimensions and lateral dimensions, and the like sometimes differ from those of the actual product.

Figure 1:
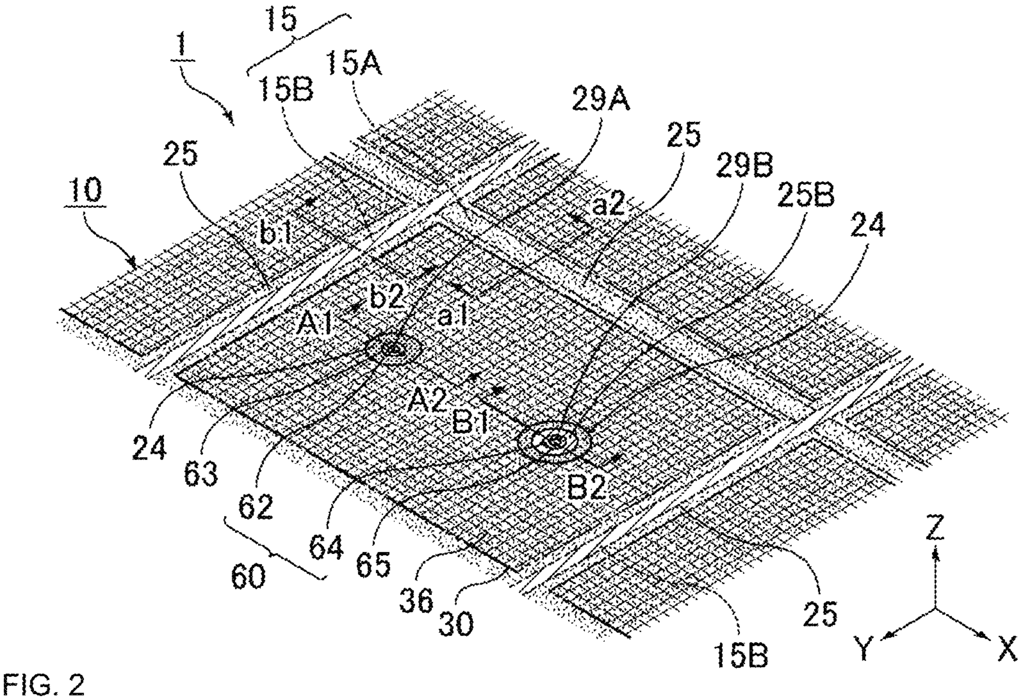
FIG. 1 is a schematic perspective view of an example of a capacitor array according to the present disclosure.

FIG. 1 is a schematic perspective view of an example of a capacitor array according to the present disclosure.

The capacitor array 1 illustrated in FIG. 1 includes a capacitor layer 10. As illustrated in FIG. 1, the capacitor array 1 may further include a sealing layer 25 sealing the capacitor layer 10.

The capacitor layer 10 includes capacitor elements 30.

In the capacitor layer 10, the capacitor elements 30 are separated from one another by through slits 15 and two-dimensionally arranged in a plane direction orthogonal to the thickness direction Z.

The number of capacitor elements 30 included in the capacitor layer 10 is two or more and is not limited to specific numbers.

In the capacitor layer 10, the capacitor elements 30 may be arranged in a straight line, in other words, in one direction (for example, the first direction X or the second direction Y) or may be two-dimensionally arranged, in other words, in two directions (for example, the first direction X and the second direction Y). The capacitor elements 30 may be arranged regularly or irregularly. The sizes, planar shapes, and the like of the capacitor elements 30 may be all the same, or some or all of them may differ.

The capacitor layer 10 may include two or more kinds of capacitor elements 30 having different surface areas.

The capacitor layer 10 may include a capacitor element 30 having a planar shape other than rectangles. In the present specification, rectangles refer to squares or non-square rectangles. Hence, the capacitor layer 10 may include a capacitor element 30 the planar shape of which is, for example, a polygon such as a quadrilateral other than rectangles, a triangle, a pentagon, and a hexagon; a shape including a curved line; a circle; an ellipse; or the like. In this case, the capacitor layer 10 may include two or more kinds of capacitor elements 30 having different planar shapes. In addition to a capacitor element 30 having a non-rectangular planar shape, the capacitor layer 10 may include a capacitor element 30 having a rectangular planar shape, but this is not required.

In the capacitor layer 10, adjacent capacitor elements 30 are separated by through slits 15. Adjacent capacitor elements 30 need only to be physically separated. Hence, adjacent capacitor elements 30 may be electrically separated from or electrically connected to each other. For example, a group of capacitor elements 30 electrically separated from one another and a group of capacitor elements 30 electrically connected to one another may be present together.

In the case in which the capacitor array 1 includes the sealing layer 25, it is preferable that the through slits 15 be filled with the insulating material of the sealing layer 25 and the like.

Each capacitor element 30 includes a first electrode layer, a second electrode layer, and a dielectric layer, and the first electrode layer and the second electrode layer face each other in the thickness direction Z with the dielectric layer interposed therebetween.

Figure 2:
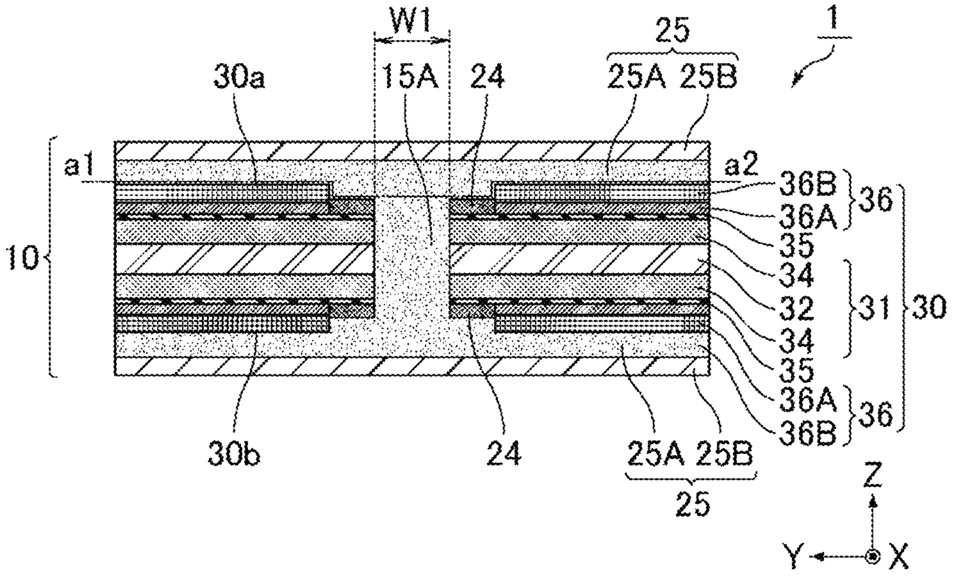
FIG. 2 is a schematic sectional view of an example of a cross section of the capacitor array including the cross section taken along line segment a1-a2 in FIG. 1.

FIG. 2 is a schematic sectional view of an example of a cross section of the capacitor array including the cross section taken along line segment a1-a2 in FIG. 1. Line segment a1-a2 in FIG. 2 corresponds to line segment a1-a2 in FIG. 1.

Figure 3:
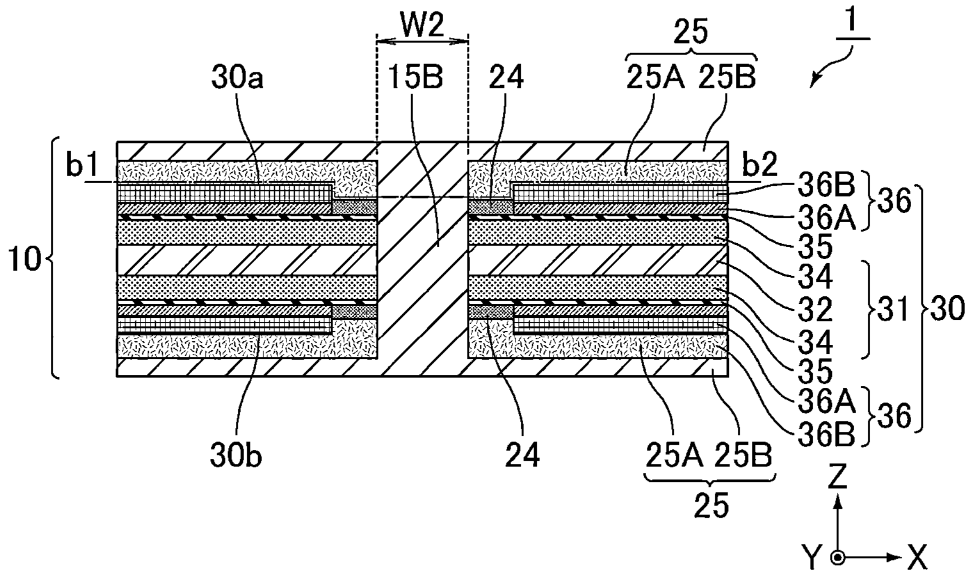
FIG. 3 is a schematic sectional view of an example of a cross section of the capacitor array including the cross section taken along line segment b1-b2 in FIG. 1.

FIG. 3 is a schematic sectional view of an example of a cross section of the capacitor array including the cross section taken along line segment b1-b2 in FIG. 1. Line segment b1-b2 in FIG. 3 corresponds to line segment b1-b2 in FIG. 1.

In the example illustrated in FIGS. 2 and 3, the capacitor element 30 includes an anode plate 31, cathode layers 36, and dielectric layers 35, and the anode plate 31 and each cathode layer 36 face each other in the thickness direction Z with the corresponding dielectric layer 35 interposed therebetween. In other words, the first electrode layer corresponds to the anode plate 31, and the second electrode layer corresponds to the cathode layer 36. With this configuration, the capacitor element 30 serves as an electrolytic capacitor.

The anode plate 31 includes, for example, a core portion 32 composed of a metal and porous portions 34 located on one or both of the main surfaces of the core portion 32. The dielectric layers 35 are located on the surfaces of the porous portions 34, and the cathode layers 36 are located on the surfaces of the dielectric layers 35.

Each cathode layer 36 includes, for example, a solid electrolyte layer 36A located on the surface of the corresponding dielectric layer 35. Each cathode layer 36 preferably further includes a conductor layer 36B located on the surface of the solid electrolyte layer 36A. In the case in which each cathode layer 36 includes the solid electrolyte layer 36A, the capacitor element 30 serves as a solid electrolytic capacitor.

It is preferable that the core portion 32 be composed of a valve metal having so-called valve action.

Examples of valve metals include pure metals such as aluminum, tantalum, niobium, titanium, and zirconium and alloys containing at least one of these metals. Among these, aluminum or aluminum alloys are preferable.

The porous portions 34 are located on one or both of the main surfaces of the core portion 32. In other words, the porous portion 34 may be located on only one main surface of the core portion 32 or may be located on both of the main surfaces of the core portion 32 as illustrated in FIGS. 2 and 3. As mentioned above, the anode plate 31 includes the porous portions 34 on one or both of the main surfaces of the core portion 32.

It is preferable that the porous portions 34 be porous layers formed on the surfaces of the core portion 32, and it is more preferable that they be etching layers.

It is preferable that the anode plate 31 have a flat plate shape, and it is more preferable that it have a foil shape. In the present specification, "plate shapes" include "foil shapes".

It is preferable that the thickness of the anode plate 31 before an etching process be 60 μm to 200 μm. It is preferable that the thickness of the core portion 32 not etched after the etching process be 15 μm to 70 μm. Although the thickness of the porous portion 34 is designed according to the required withstanding voltage and electrostatic capacity, it is preferable that the total thickness of the porous portions 34 on both sides of the core portion 32 be 10 μm to 180 μm.

It is preferable that the pore size of the porous portion 34 be 10 nm to 600 nm. The pore size of the porous portion 34 refers to the median diameter D50 measured by using a mercury porosimeter. The pore size of the porous portion 34 can be controlled, for example, by adjusting various conditions for etching.

The dielectric layer 35 is located on the surface of the porous portion 34. The dielectric layer 35 is porous reflecting the surface state of the porous portion 34 and has a surface shape including fine irregularities.

It is preferable that the dielectric layer 35 be composed of an oxide film of a valve metal mentioned above. For example, in the case in which the anode plate 31 is composed of an aluminum foil, an oxide film serving as the dielectric layer 35 is formed by performing anodic oxidation (which is also referred to as a chemical conversion treatment) on the anode plate 31 in a water solution containing ammonium adipate or the like. Since the dielectric layer 35 is formed along the surface of the porous portion 34, the dielectric layer 35 has pores (recesses).

Although the thickness of the dielectric layer 35 is designed according to the required withstanding voltage and electrostatic capacity, it is preferable that the thickness of the dielectric layer 35 be 10 nm to 100 nm.

The cathode layer 36 is located on the surface of the dielectric layer 35.

In the case in which the cathode layer 36 includes the solid electrolyte layer 36A, examples of the constituent material of the solid electrolyte layer 36A include conductive polymers such as polypyrroles, polythiophenes, and polyanilines. Among these, polythiophenes are preferable, and in particular, poly(3,4-ethylenedioxythiophene) referred to as PEDOT is preferable. The conductive polymer may contain a dopant such as polystyrene sulfonic acid (PSS).

It is preferable that the solid electrolyte layer 36A include an inner layer which is filling in pores (recesses) of the dielectric layer 35 and an outer layer covering the surface of the dielectric layer 35.

It is preferable that the thickness of the solid electrolyte layer 36A from the surface of the porous portion 34 be 2 μm to 20 μm.

The solid electrolyte layer 36A is formed, for example, by a method including forming a film of a polymer such as poly(3,4-ethylenedioxythiophene) on the surface of the dielectric layer 35 by using a treatment liquid containing a monomer such as 3,4-ethylenedioxythiophene, a method including applying a dispersion of a polymer such as poly (3,4-ethylenedioxythiophene) onto the surface of the dielectric layer 35 and then drying it, or other methods.

The solid electrolyte layer 36A is formed in a specified region by applying the above treatment liquid or dispersion onto the surface of the dielectric layer 35 by a method such as sponge transfer, screen printing, dispenser application, or inkjet printing.

In the case in which the cathode layer 36 includes the conductor layer 36B, it is preferable that the conductor layer 36B include at least one of a conductive resin layer and a metal layer. In other words, the conductor layer 36B may include only a conductive resin layer, only a metal layer, or both a conductive resin layer and a metal layer.

Examples of the conductive resin layer include a conductive adhesive layer containing at least one kind of conductive fillers selected from the group of silver fillers, copper fillers, nickel fillers, and carbon fillers.

Examples of the metal layer include a metal plating film and a metal foil. It is preferable that the metal layer be composed of at least one kind of metal selected from the group of nickel, copper, silver, and alloys containing at least one of these metals as the main component.

In the present specification, the main component denotes the element component having the largest weight ratio.

The conductor layer 36B includes, for example, a carbon layer located on the surface of the solid electrolyte layer 36A and a copper layer located on the surface of the carbon layer.

The carbon layer is provided for electrically and mechanically connecting the solid electrolyte layer 36A and the copper layer.

The carbon layer is formed in a specified region, for example, by applying a carbon paste onto the surface of the solid electrolyte layer 36A by a method such as sponge transfer, screen printing, dispenser application, or inkjet printing. It is preferable that application of the copper layer, which is the next process, be performed on the carbon layer when the carbon layer still has viscosity before being dried. It is preferable that the thickness of the carbon layer be 2 μm to 20 μm.

The copper layer is formed in a specified region, for example, by applying a copper paste onto the surface of the carbon layer by a method such as sponge transfer, screen printing, spray application, dispenser application, or inkjet printing. It is preferable that the thickness of the copper layer be 2 μm to 20 μm.

The capacitor element 30 illustrated in FIGS. 2 and 3 has a first main surface 30*a* and a second main surface 30*b* opposed to each other in the thickness direction Z.

As illustrated in FIG. 1, the through slits 15 include first through slits 15A in the first direction X and second through slits 15B in the second direction Y.

The first direction X is orthogonal to the thickness direction Z.

The second direction Y is orthogonal to the thickness direction Z and intersects the first direction X.

The first direction X and the second direction Y may be orthogonal to each other as illustrated in FIG. 1 but may intersect each other at an angle other than 90°.

In the example illustrated in FIG. 2, when a cross section in the thickness direction Z is viewed, more specifically, when a cross section in the thickness direction Z and the second direction Y is viewed, the width W1 (the dimension in the second direction Y in this case) of the first through slit 15A is uniform in the thickness direction Z.

Although not illustrated in FIG. 2, when a cross section in the thickness direction Z is viewed, more specifically, when a cross section in the thickness direction Z and the second direction Y is viewed, the first through slit 15A may be tapered such that the width W1 decreases from one of the first main surface 30*a* and the second main surface 30*b* of the capacitor element 30 toward the other.

For example, the width W1 of the first through slit 15A may decrease from the first main surface 30*a* of the capacitor element 30 toward the second main surface 30*b*, or the width W1 of the first through slit 15A may decrease from the second main surface 30*b* of the capacitor element 30 toward the first main surface 30*a*.

In the case in which the first through slit 15A is tapered, the sectional shape of the first through slit 15A in the thickness direction Z may be symmetrical or asymmetrical.

In the example illustrated in FIG. 3, when a cross section in the thickness direction Z is viewed, more specifically, when a cross section in the thickness direction Z and the first direction X is viewed, the width W2 (the dimension in the first direction X in this case) of the second through slit 15B is uniform in the thickness direction Z.

Although not illustrated in FIG. 3, when a cross section in the thickness direction Z is viewed, more specifically, when a cross section in the thickness direction Z and the first direction X is viewed, the second through slit 15B may be tapered such that the width W2 decreases from one of the first main surface 30*a* and the second main surface 30*b* of the capacitor element 30 toward the other.

For example, the width W2 of the second through slit 15B may decrease from the first main surface 30*a* of the capacitor element 30 toward the second main surface 30*b*, or the width W2 of the second through slit 15B may decrease from the second main surface 30*b* of the capacitor element 30 toward the first main surface 30*a*.

In the case in which the second through slit 15B is tapered, the sectional shape of the second through slit 15B in the thickness direction Z may be symmetrical or asymmetrical.

In the case in which both the first through slit 15A and the second through slit 15B are tapered, it is preferable that the width W1 of the first through slit 15A decreases from the first main surface 30*a* of the capacitor element 30 toward the second main surface 30*b* and that the width W2 of the second through slit 15B decreases from the first main surface 30*a* of the capacitor element 30 toward the second main surface 30*b*.

In the case in which both the first through slit 15A and the second through slit 15B are tapered, it is preferable that the taper angle of the first through slit 15A and the taper angle of the second through slit 15B differ from each other.

In the present specification, the taper angle of a through slit refers to the angle formed by the two sides facing each other and defining the outline of the through slit when a cross section in the thickness direction is viewed.

In the case in which the width W1 of the first through slit 15A decreases from the first main surface 30*a* of the capacitor element 30 toward the second main surface 30*b* and in which the width W2 of the second through slit 15B decreases from the first main surface 30*a* of the capacitor element 30 toward the second main surface 30*b*, it is preferable that the taper angle of the second through slit 15B be smaller than the taper angle of the first through slit 15A. In this case, the inclination angles, relative to the thickness direction Z, of the end surfaces of the capacitor element 30 on the second through slit 15B sides are small, and the effective regions of the capacitor elements 30 can be large on the second through slit 15B sides.

In the case in which the widths of both the first through slit 15A and the second through slit 15B decrease from the first main surface 30*a* of the capacitor element 30 toward the second main surface 30*b*, it is preferable that the maximum value of the width W2 of the second through slit 15B be smaller than the maximum value of the width W1 of the first through slit 15A in the plane including the first main surface 30*a* of the capacitor element 30. In this case, in the region where the capacitor elements 30 are not present, in other words, the region where the first through slits 15A or the second through slits 15B are present, at least the regions where the second through slits 15B are present can be smaller in the capacitor layer 10, so that the regions where the capacitor elements 30 are present can be larger in the capacitor layer 10.

The taper shapes, the taper angles, and the widths of the first through slit and the second through slit are checked by observing cross sections in the thickness direction as illustrated in FIGS. 2 and 3 by using a scanning electron microscope (SEM).

As illustrated in FIGS. 2 and 3, it is preferable that the capacitor layer 10 further include insulation layers 24 located on parts of the surfaces of the dielectric layers 35 where the cathode layer 36 is not present, on one or both of the first main surface 30*a* side and the second main surface 30*b* side of the capacitor element 30. This configuration provides the insulation between the anode plate 31 and the cathode layers 36, preventing a short circuit between them.

The insulation layer 24 may be provided on the surface of the dielectric layer 35 on the first main surface 30*a* side of the capacitor element 30, may be provided on the surface of the dielectric layer 35 on the second main surface 30*b* side of the capacitor element 30, or may be provided on the surfaces of the dielectric layers 35 on both the first main surface 30*a* side and the second main surface 30*b* side of the capacitor element 30 as illustrated in FIGS. 2 and 3.

The insulation layer 24 is composed of an insulating material. In this case, it is preferable that the insulation layer 24 be composed of an insulating resin.

Examples of the insulating material composing the insulation layer 24 include polyphenylsulfone resins, polyethersulfone resins, cyanate ester resins, fluororesins (tetrafluoroethylene, tetrafluoroethylene-perfluoroalkylvinyl ether copolymer, and the like), polyimide resins, polyamideimide resins, epoxy resins, and derivatives or precursors of one of these.

The insulation layer 24 may be composed of the same resin as the sealing layer 25. Unlike the sealing layer 25, if the insulation layer 24 contains inorganic fillers, there is a possibility that the fillers causes adverse effects on the capacitance effective portions of the capacitor elements 30. Hence, it is preferable that the insulation layer 24 be composed of a system consisting solely of resin.

The insulation layer 24 is formed in a specified region, for example, by applying a mask material such as a composition containing an insulating resin onto the surface of the porous portion 34 by a method such as sponge transfer, screen printing, dispenser application, or inkjet printing.

The insulation layer 24 may be formed on the porous portion 34 before the dielectric layer 35 is formed or after the dielectric layer 35 is formed.

As illustrated in FIGS. 2 and 3, the sealing layer 25 is located on both main surfaces of the capacitor element 30 opposed to each other in the thickness direction Z, in other words, the first main surface 30*a* and the second main surface 30*b* of the capacitor element 30.

As illustrated in FIGS. 2 and 3, the sealing layer 25 preferably includes a first sealing layer 25A located on both main surfaces of the capacitor element 30 opposed to each other in the thickness direction Z, in other words, the first main surface 30*a* and the second main surface 30*b* of the capacitor element 30.

As illustrated in FIG. 2, the first sealing layer 25A preferably extends into the first through slit 15A.

As illustrated in FIG. 3, the first sealing layer 25A preferably does not extend into the second through slit 15B.

As illustrated in FIGS. 2 and 3, the sealing layer 25 preferably further includes a second sealing layer 25B located on the surfaces of the first sealing layer 25A.

As illustrated in FIG. 2, the second sealing layer 25B preferably does not extend into the first through slit 15A.

As illustrated in FIG. 3, the second sealing layer 25B preferably extends into the second through slit 15B.

As mentioned above, as illustrated in FIG. 2, preferably, the first sealing layer 25A extends, and the second sealing layer 25B does not extend, into the first through slit 15A.

In addition, as illustrated in FIG. 3, preferably, the first sealing layer 25A does not extend, and the second sealing layer 25B extends, into the second through slit 15B. In other words, as illustrated in FIG. 3, the first sealing layer 25A is preferably divided by the second sealing layer 25B at the positions where the first sealing layer 25A overlaps the second through slit 15B in the thickness direction Z.

The sealing layer 25 including the first sealing layer 25A and the second sealing layer 25B is composed of an insulating material. In this case, it is preferable that the sealing layer 25 be composed of an insulating resin.

Examples of the insulating resin composing the sealing layer 25 include epoxy resins and phenol resins.

It is preferable that the sealing layer 25 further contain fillers.

Examples of the fillers contained in the sealing layer 25 include inorganic fillers such as silica particles and alumina particles.

The constituent materials of the first sealing layer 25A and the second sealing layer 25B may be the same or different.

The sealing layer 25 including the first sealing layer 25A and the second sealing layer 25B is formed to seal the capacitor layer 10, for example, by a method including thermal pressure bonding of insulating resin sheets, a method including applying an insulating resin paste and then heat-curing it, or other methods.

Between the capacitor layer 10 and the sealing layer 25, for example, a layer such as a stress relief layer or a moisture barrier film may be provided.

The capacitor array 1 having the cross sections illustrated in FIGS. 2 and 3 is manufactured, for example, by the following method.

Figure 4:
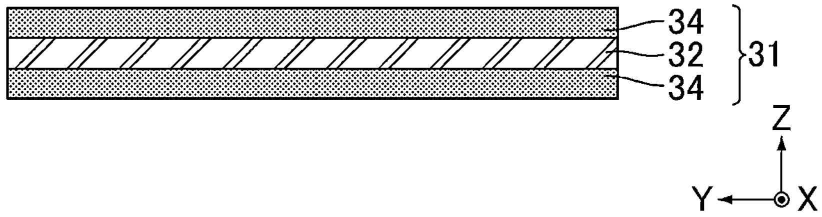
FIG. 4 is a schematic sectional diagram illustrating an example of a step of preparing an anode plate 31.

FIG. 4 is a schematic sectional diagram illustrating an example of a step of preparing an anode plate 31.

As illustrated in FIG. 4, an anode plate 31 including a porous portion 34 on one or both of the main surfaces of the core portion 32 is prepared.

Figure 5:
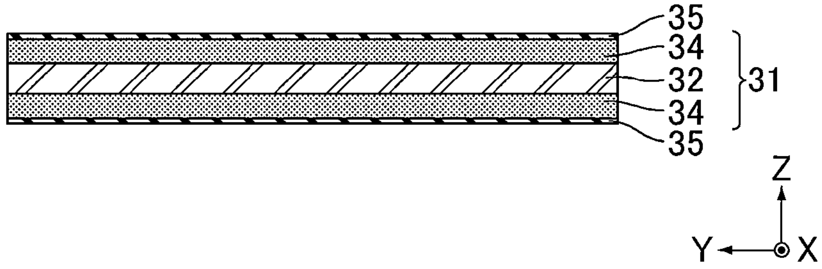
FIG. 5 is a schematic sectional diagram illustrating an example of a step of forming dielectric layers.

FIG. 5 is a schematic sectional diagram illustrating an example of a step of forming dielectric layers.

For example, anodic oxidation is performed on the anode plate 31 to form dielectric layers 35 on the surfaces of the porous portions 34 as illustrated in FIG. 5.

Alternatively, an etched foil may be prepared as an anode plate 31 having dielectric layers 35 on the surfaces of porous portions 34.

Figure 6:
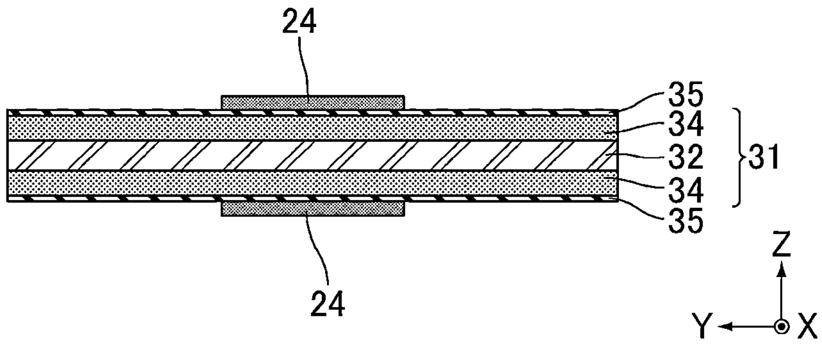
FIG. 6 is a schematic sectional diagram illustrating an example of a step of forming insulation layers.

FIG. 6 is a schematic sectional diagram illustrating an example of a step of forming insulation layers.

In order to separate the effective regions of the capacitor elements 30 (see FIG. 1 and other figures), insulation layers 24 are formed in specified regions as illustrated in FIG. 6, for example, by applying an insulating resin onto the surfaces of the dielectric layers 35 by a method such as screen printing or dispenser application.

Figure 7:
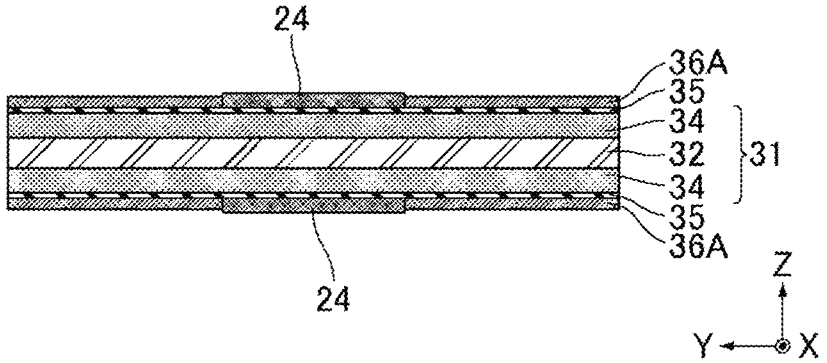
FIG. 7 is a schematic sectional diagram illustrating an example of a step of forming solid electrolyte layers.

FIG. 7 is a schematic sectional diagram illustrating an example of a step of forming solid electrolyte layers.

As illustrated in FIG. 7, solid electrolyte layers 36A are formed in the regions of the surfaces of the dielectric layers 35 where the insulation layer 24 is not present. The solid electrolyte layers 36A are formed, for example, by a method including forming a film of a polymer such as poly(3,4-ethylenedioxythiophene) on the surfaces of the dielectric layers 35 by using a treatment liquid containing a monomer such as 3,4-ethylenedioxythiophene, a method including applying a dispersion of a polymer such as poly(3,4-ethylenedioxythiophene) onto the surfaces of the dielectric layers 35 and then drying it, or other methods. Note that it is preferable that the solid electrolyte layers 36A be formed such that inner layers are formed by filling pores (recesses) of the dielectric layers 35 and that then outer layers are formed to cover the surfaces of the dielectric layers 35.

Figure 8:
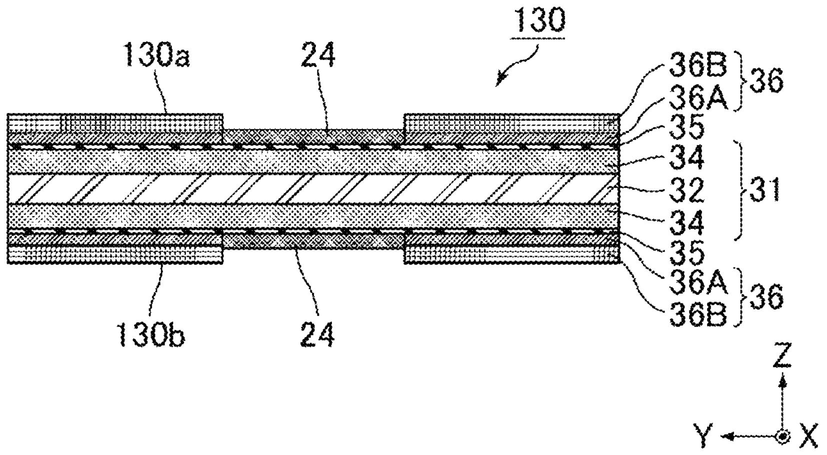
FIG. 8 is a schematic sectional diagram illustrating an example of a step of forming conductor layers.

FIG. 8 is a schematic sectional diagram illustrating an example of a step of forming conductor layers.

As illustrated in FIG. 8, conductor layers 36B are formed on the surfaces of the solid electrolyte layers 36A. For example, as the conductor layers 36B, carbon layers and copper layers are formed in this order on the solid electrolyte layers 36A. In this case, the carbon layers are formed in specified regions, for example, by applying a carbon paste onto the surfaces of the solid electrolyte layers 36A by a method such as sponge transfer, screen printing, dispenser application, or inkjet printing. After that, the copper layers are formed in specified regions, for example, by applying a copper paste onto the surfaces of the carbon layers by a method such as sponge transfer, screen printing, spray application, dispenser application, or inkjet printing.

Thus, the cathode layers 36 each including the solid electrolyte layer 36A and the conductor layer 36B are formed on the surfaces of the dielectric layers 35.

Figure 9:
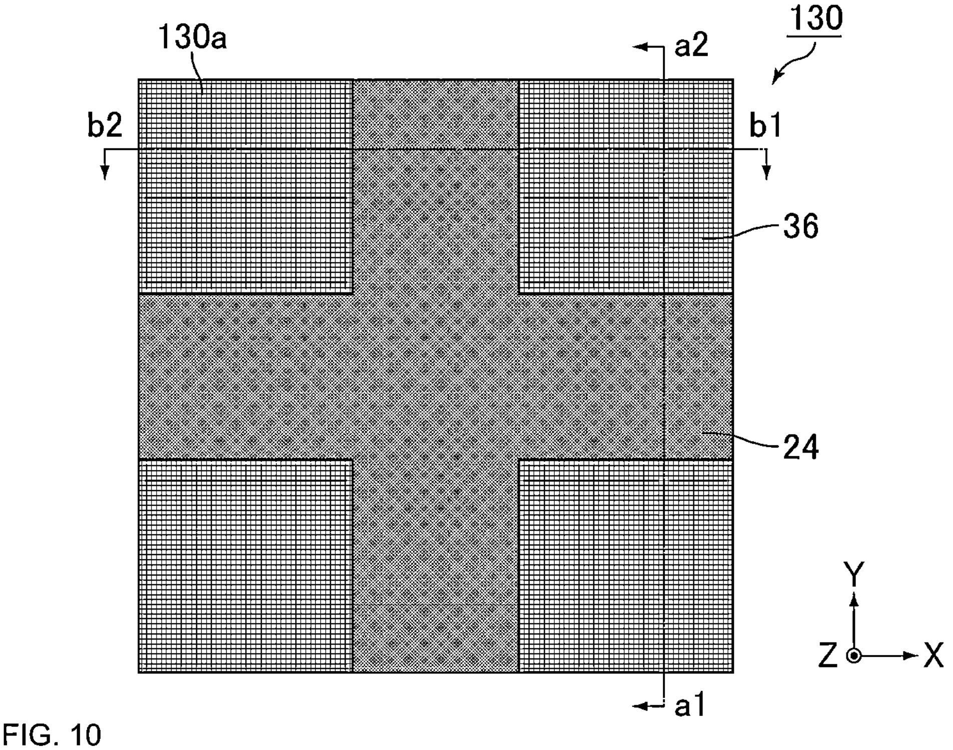
FIG. 9 is a schematic plan view of an example of a capacitor sheet.

FIG. 9 is a schematic plan view of an example of a capacitor sheet.

Through the above processes, a capacitor sheet 130 as illustrated in FIGS. 8 and 9 is formed including the anode plate 31, the dielectric layers 35 located on the surfaces of the porous portions 34 of the anode plate 31, and the insulation layers 24 and the cathode layers 36 located on the surfaces of the dielectric layers 35.

As illustrated in FIGS. 8 and 9, the capacitor sheet 130 has a first main surface 130*a* and a second main surface 130*b* opposed to each other in the thickness direction Z.

Figure 10:
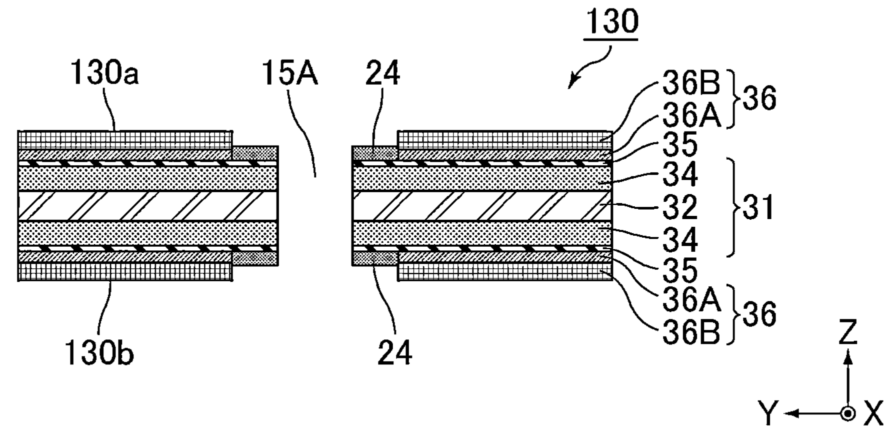
FIG. 10 is a schematic sectional diagram illustrating how an example of a step of forming a first through slit is performed in the cross section taken along line segment a1-a2 in FIG. 9.

FIG. 10 is a schematic sectional diagram illustrating how an example of a step of forming a first through slit is performed in the cross section taken along line segment a1-a2 in FIG. 9.

For example, laser processing is performed in the portion of the capacitor sheet 130 having the cross section taken along line segment a1-a2 in FIG. 9, from the first main surface 130*a* side. With this process, as illustrated in FIG. 10, a first through slit 15A extending through the capacitor sheet 130 in the thickness direction Z is formed in the first direction X at positions not overlapping the cathode layers 36 in the thickness direction Z.

Note that the first through slit 15A may be formed by performing laser processing in the portion of the capacitor sheet 130 having the cross section taken along line segment a1-a2 in FIG. 9, from the second main surface 130*b* side.

The processing method for forming the first through slit 15A is not limited to laser processing but may be, for example, a method such as cutting with a dicing machine or a router.

As described above, when the first through slit 15A in the first direction X is formed in the capacitor sheet 130, the capacitor sheet 130 is cut in the first direction X. In this process, it is preferable that the first through slit 15A be formed in the first direction X such that the capacitor sheet 130 is not cut continuously from one end to the other end in the first direction X. This prevents the capacitor sheet 130 from being completely divided into independent pieces, improving the handleability in the later steps.

Note that in the capacitor sheet 130, the step of forming the first through slit 15A is not performed in the portion having the cross section taken along line segment b1-b2 in FIG. 9.

Figure 11:
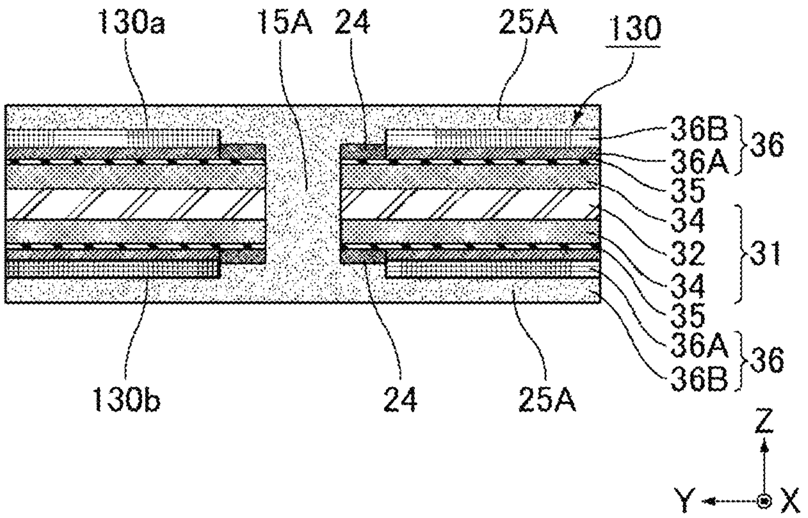
FIG. 11 is a schematic sectional diagram illustrating how an example of a step of forming a first sealing layer is performed in the cross section illustrated in FIG. 10.

FIG. 11 is a schematic sectional diagram illustrating how an example of a step of forming a first sealing layer is performed in the cross section illustrated in FIG. 10.

For example, insulating resin sheets are thermal-pressure bonded to the capacitor sheet 130 having the cross section illustrated in FIG. 10. With this process, as illustrated in FIG. 11, the first sealing layer 25A is formed on the first main surface 130*a* and the second main surface 130*b* of the capacitor sheet 130 and also formed in the first through slit 15A. With the above process, the capacitor sheet 130 is fixed by the first sealing layer 25A in the state of being partially divided by the first through slit 15A.

The first sealing layer 25A formed as described above is present on the first main surface 130*a* and the second main surface 130*b* of the capacitor sheet 130, and the first sealing layer 25A extends into the first through slit 15A, as illustrated in FIG. 11.

In the case in which the capacitor sheet 130 is not completely divided into independent pieces even though the first through slit 15A is formed as described above, when the first sealing layer 25A is formed, it is possible to prevent such defects that the portions of the capacitor sheet 130 divided by the first through slit 15A move and come into contact with one another due to the influence of the flow of the constituent material (for example, a resin material) of the first sealing layer 25A. Hence, the occurrence of a short circuit between capacitor elements can be prevented in the capacitor array obtained later.

In addition, in the case in which the first sealing layer 25A is formed by press molding through thermal pressure bonding of insulating resin sheets, the defect mentioned above can be prevented even if the press molding is performed at high pressure. Hence, the process margin for forming the first sealing layer 25A can be large, and this improves the processability. In the case in which the first sealing layer 25A can be formed by high-pressure press molding, the adhesion between the first sealing layer 25A and the capacitor sheet 130 can be improved, and voids in the first sealing layer 25A can be reduced. This leads to an improvement in the reliability of the capacitor array obtained later.

Figure 12:
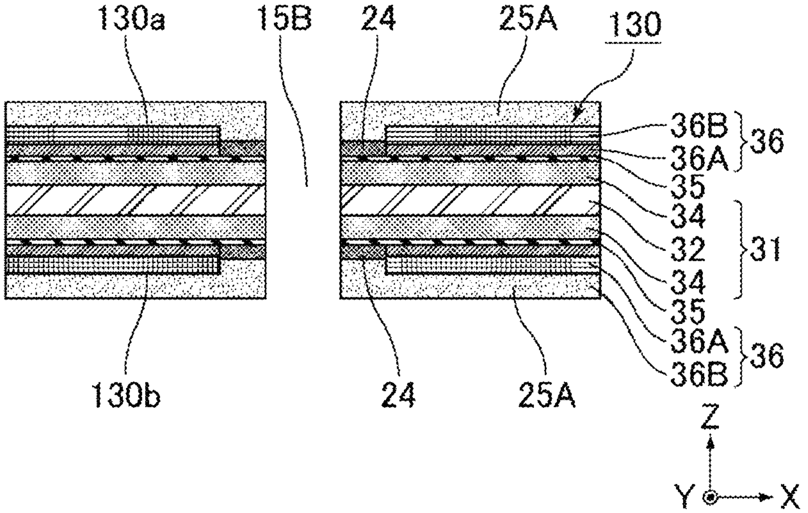
FIG. 12 is a schematic sectional diagram illustrating how an example of a step of forming a second through slit is performed in the cross section taken along line segment b1-b2 in FIG. 9.

FIG. 12 is a schematic sectional diagram illustrating how an example of a step of forming a second through slit is performed in the cross section taken along line segment b1-b2 in FIG. 9.

For example, laser processing is performed in the portion having the cross section taken along line segment b1-b2 in FIG. 9 in the capacitor sheet 130 having the first sealing layer 25A, from the first main surface 130*a* side. With this process, as illustrated in FIG. 12, a second through slit 15B extending through the capacitor sheet 130 and the first sealing layer 25A in the thickness direction Z is formed in the second direction Y at positions not overlapping the cathode layers 36 in the thickness direction Z.

Note that the second through slit 15B may be formed by performing laser processing in the portion having the cross section taken along line segment b1-b2 in FIG. 9 in the capacitor sheet 130 having the first sealing layer 25A, from the second main surface 130*b* side.

The processing method for forming the second through slit 15B is not limited to laser processing but may be, for example, a method such as cutting with a dicing machine or a router. The processing method for forming the second through slit 15B may be the same as or different from the processing method for forming the first through slit 15A.

As described above, when the second through slit 15B in the second direction Y is formed in the capacitor sheet 130 having the first sealing layer 25A, the capacitor sheet 130 and the first sealing layer 25A are cut together in the second direction Y. In this process, it is preferable that the second through slit 15B be formed in the second direction Y such that the capacitor sheet 130 having the first sealing layer 25A is not cut continuously from one end to the other end in the second direction Y. This prevents the capacitor sheet 130 having the first sealing layer 25A from being completely divided into independent pieces, improving the handleability in the later steps.

Note that in the capacitor sheet 130, the step of forming the second through slit 15B is not performed in the portion having the cross section taken along line segment a1-a2 in FIG. 9.

Figure 13:
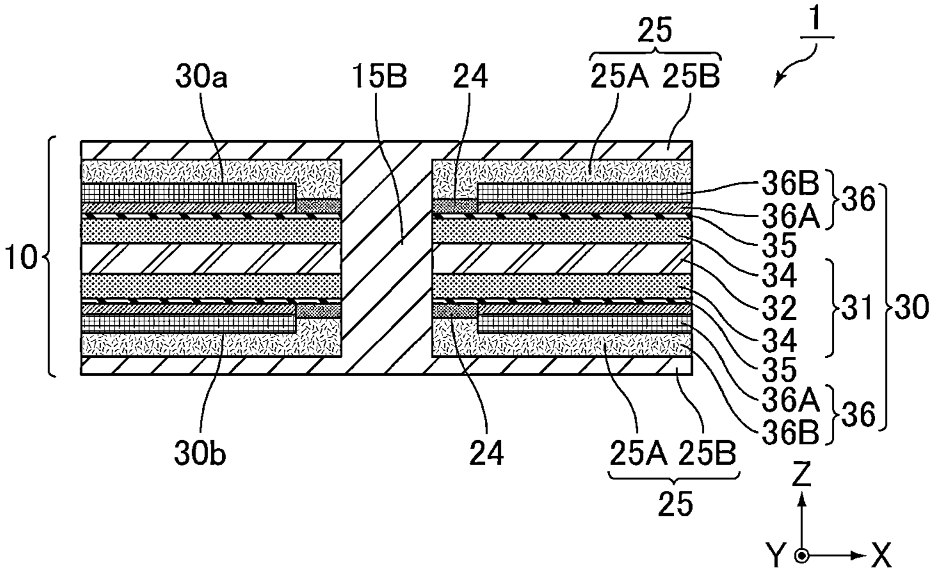
FIG. 13 is a schematic sectional diagram illustrating how an example of a step of forming a second sealing layer is performed in the cross section illustrated in FIG. 12.

FIG. 13 is a schematic sectional diagram illustrating how an example of a step of forming a second sealing layer is performed in the cross section illustrated in FIG. 12.

For example, insulating resin sheets are thermal-pressure bonded to the capacitor sheet 130 having the cross section illustrated in FIG. 12, so that the second sealing layer 25B is formed on the surfaces of the first sealing layer 25A and also formed in the second through slit 15B as illustrated in FIG. 13.

The second sealing layer 25B formed as described above is present on the surfaces of the first sealing layer 25A and also extends in the second through slit 15B, as illustrated in FIG. 13.

Through the processes above, the capacitor layer 10 including the capacitor elements 30 separated by the first through slit 15A and the second through slit 15B and two-dimensionally arranged is formed, and the capacitor elements 30 are integrated by the first sealing layer 25A and the second sealing layer 25B. Thus, the capacitor array 1 having the cross sections illustrated in FIGS. 2 and 3 is manufactured.

In the foregoing method of manufacturing the capacitor array 1, the cutting step for dividing the capacitor sheet 130 into the capacitor elements 30 is divided into the step of forming the first through slit 15A and the step of forming the second through slit 15B, and, in addition, the step of forming the first sealing layer 25A is performed between these steps. This prevents the capacitor sheet 130 from being completely divided into independent pieces during manufacturing, improving the handleability. In addition, in the step of forming the first sealing layer 25A, the press molding can be performed at high pressure, which improves the processability, leading to an improvement in the reliability of the capacitor array 1.

FIGS. 14A, 14B, and 14C are schematic plan diagrams illustrating an example of a cutting step for a capacitor sheet according to a comparative example outside the scope of the present disclosure. FIG. 15 is a schematic plan view of an example of the capacitor array according to the comparative example.

As described above, after a first through slit 15A is formed in a capacitor sheet 130 as illustrated in FIG. 14A, a first sealing layer 25A is formed in the first through slit 15A as illustrated in FIG. 14B. When a second through slit 15B is formed to intersect the first through slit 15A as illustrated in FIG. 14C, if a metal scrap (for example, an aluminum scrap) generated by cutting the capacitor sheet 130 is attached to span the intersection region of the first through slit 15A and the second through slit 15B, there is a possibility that a short circuit occurs between capacitor elements 30 adjacent in the final product (see FIG. 15). In FIG. 14C, the portions where a short circuit may occur are indicated by surrounding them with dashed lines.

As illustrated in FIG. 15, if stress is concentrated at a corner portion in the intersection region of the first through slit 15A and the second through slit 15B, there is a possibility that the corner portion becomes a start point of a crack or separation (delamination).

Figure 16A:
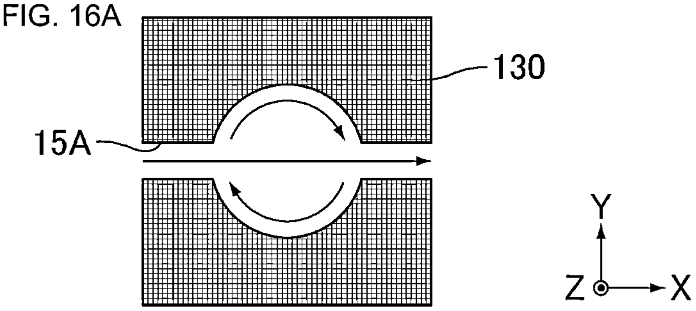
FIGS. 16A, 16B, and 16C are schematic plan diagrams illustrating an example of a cutting step for a capacitor sheet according to Example 1 within the scope of the present disclosure.
Figure 16B:
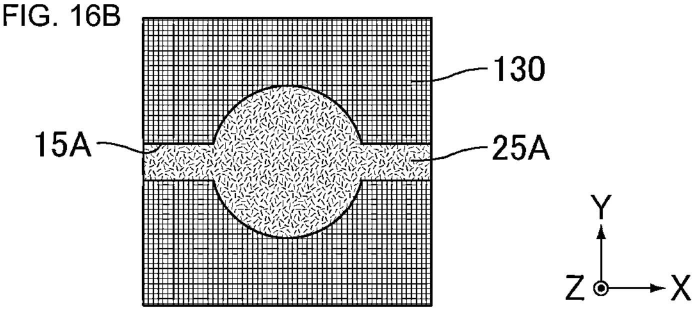
Figure 16C:
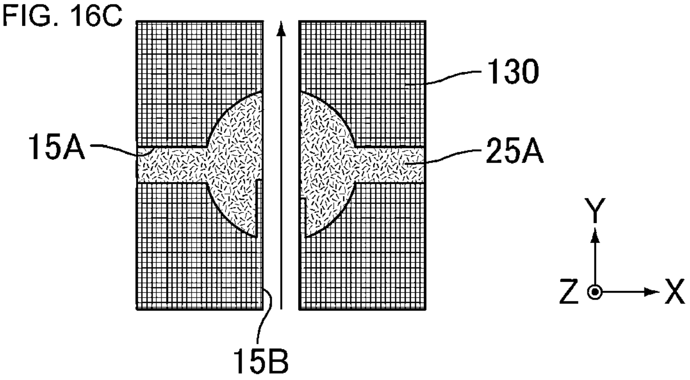
Figure 17:
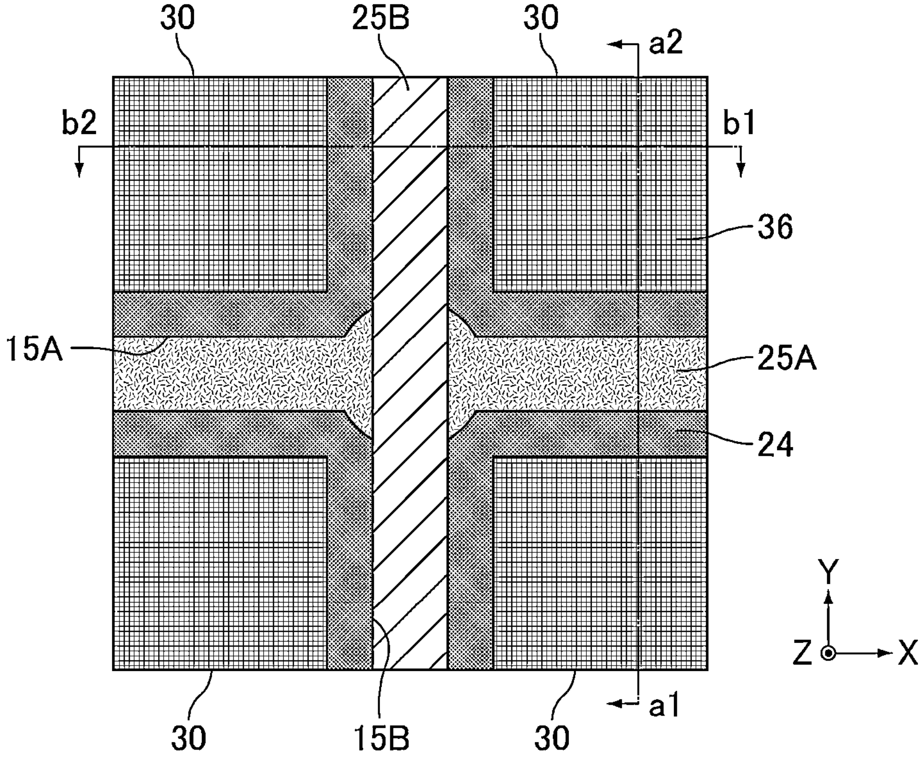
FIG. 17 is a schematic plan view of the example of the capacitor array according to Example 1.

FIGS. 16A, 16B, and 16C are schematic plan diagrams illustrating an example of a cutting step for a capacitor sheet according to Example 1 within the scope of the present disclosure. FIG. 17 is a schematic plan view of the example of the capacitor array according to Example 1.

As illustrated in FIG. 16A, a first through slit 15A is formed such that the area of the portion where the first through slit 15A intersects a second through slit 15B is large. The planar shape of the portion in this case is not limited to circles. With this configuration, after the first sealing layer 25A is formed in the first through slit 15A as illustrated in FIG. 16B, even if a metal scrap (for example, an aluminum scrap) is generated when the second through slit 15B is formed as illustrated in FIG. 16C, the possibility of causing a short circuit defect can be reduced between capacitor elements 30 (see FIG. 17) adjacent in the final product because the width of the first through slit 15A is large in the intersection region of the first through slit 15A and the second through slit 15B.

In addition, in the case in which the width of the first through slit 15A is large in the intersection region of the first through slit 15A and the second through slit 15B, the effective regions of the capacitor elements 30 can be larger than in the case in which the entire with of the first through slit 15A is large.

Since the area of the intersection region of the first through slit 15A and the second through slit 15B is large as illustrated in FIG. 17, the area of the portion functioning as a prop connecting the front and back sealing layers is large, and the adhesion strength between the front and back is high. Thus, delamination can be reduced.

Note that the cross section of the capacitor array including the cross section taken along line segment a1-a2 in FIG. 17 corresponds to FIG. 2, and the cross section of the capacitor array including the cross section taken along line segment b1-b2 in FIG. 17 corresponds to FIG. 3.

FIGS. 18A, 18B, 18C, and 18D are schematic plan diagrams illustrating an example of a cutting step for a capacitor sheet according to Example 2 within the scope of the present disclosure. FIG. 19 is a schematic plan view of an example of the capacitor array according to Example 2.

Figure 18A:
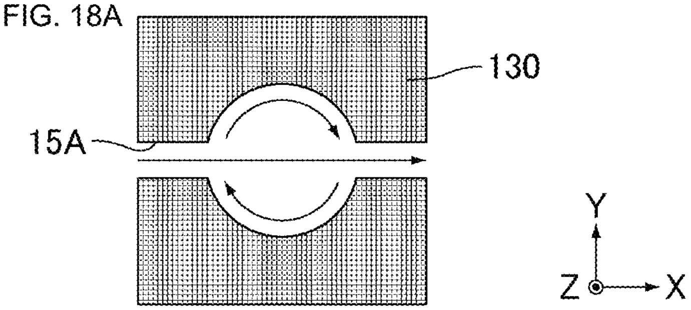
FIGS. 18A, 18B, 18C, and 18D are schematic plan diagrams illustrating an example of a cutting step for a capacitor sheet according to Example 2 within the scope of the present disclosure.
Figure 18B:
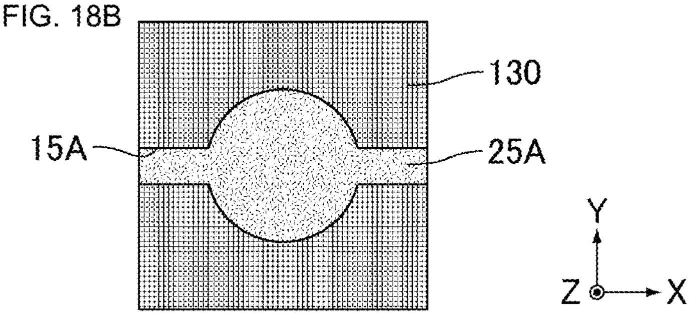
Figure 18C:
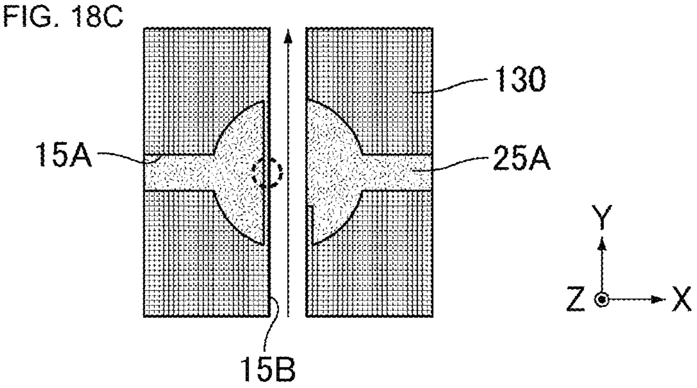
Figure 19:
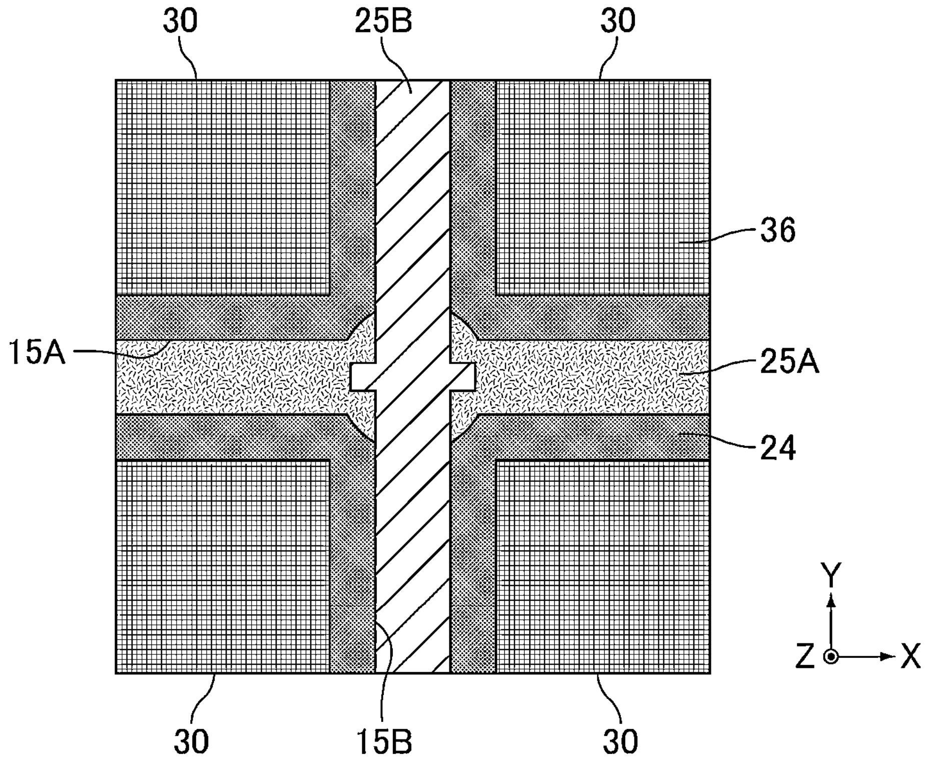
FIG. 19 is a schematic plan view of an example of the capacitor array according to Example 2.

Even if the first through slit 15A is formed such that the area of the portion where the first through slit 15A intersects the second through slit 15B is large as illustrated in FIG. 18A, after the first sealing layer 25A is formed in the first through slit 15A as illustrated in FIG. 18B, a short circuit may occur between capacitor elements 30 (see FIG. 19) adjacent in the final product when the second through slit 15B is formed as illustrated in FIG. 18C. In FIG. 18C, the portion where a short circuit may occur is indicated by surrounding it with a dashed line.

Figure 18D:
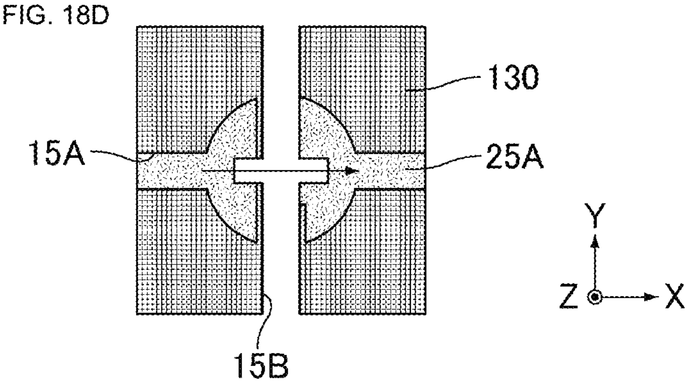

To address this, the portion where a short circuit has occurred in the intersection region of the first through slit 15A and the second through slit 15B may be cut again by a method such as laser processing as illustrated in FIG. 18D. The planar shape of the cut portion is not limited to a line shape. In addition, the cutting direction is not limited to the first direction X. Cutting as illustrated in FIG. 18D further reduces the possibility of a short circuit defect between capacitor elements 30 (see FIG. 19) adjacent in the final product. As long as at least the short circuit portion is cut as illustrated in FIG. 18D, other portions may also be cut.

Since the area of the intersection region of the first through slit 15A and the second through slit 15B is large, even if the cut portion is shifted a little when the short circuit portion is cut again, it is possible to prevent the capacitor elements 30 from being cut. Note that it is preferable that the area of the portion to be processed to cut again the short circuit portion to prevent the occurrence of a new short circuit be smaller than the area of the first through slit 15A in the intersection region of the first through slit 15A and the second through slit 15B.

Figure 20:
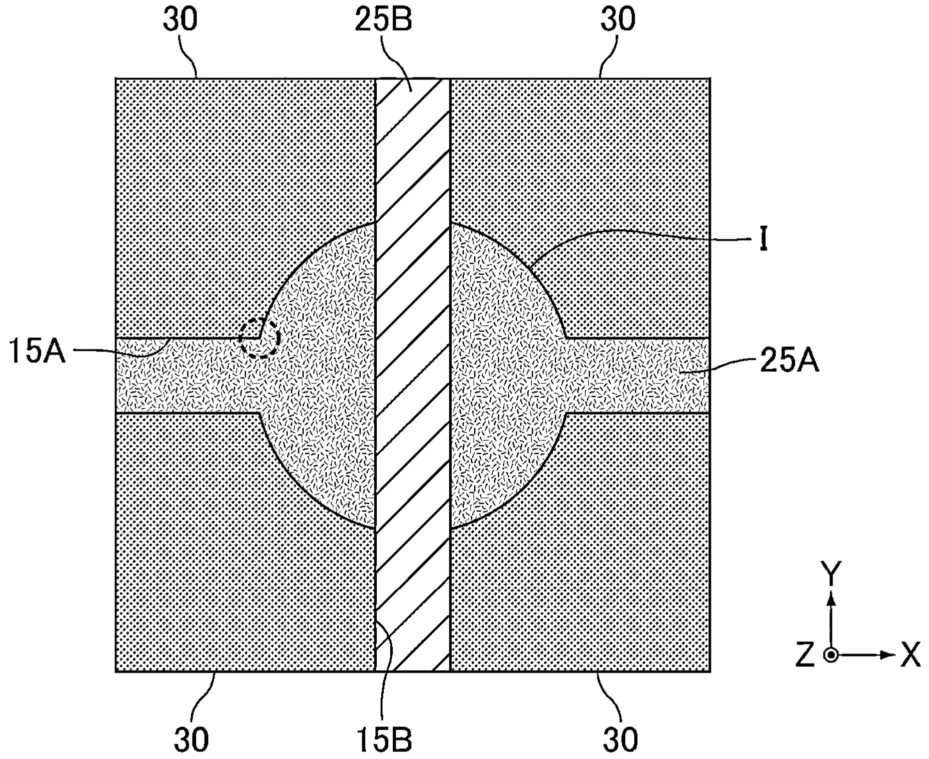
FIG. 20 is a schematic plan view of an example of an intersection region of the capacitor array according to Example 1.
Figure 21:
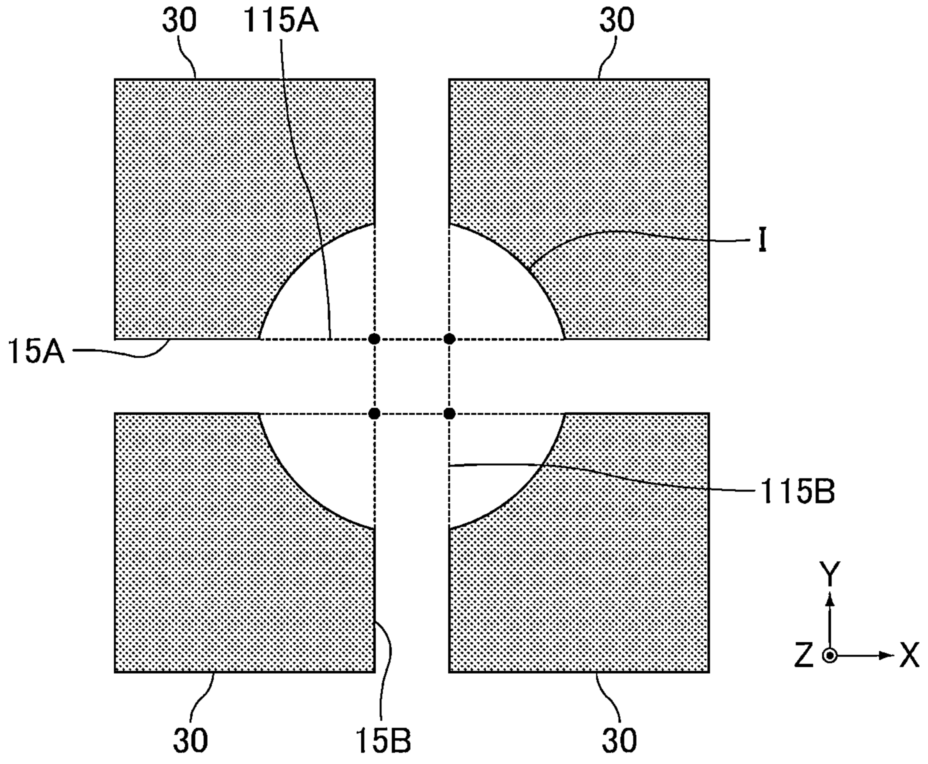
FIG. 21 is a schematic plan view of the capacitor array illustrated in FIG. 20 without the first sealing layer and the second sealing layer.

FIG. 20 is a schematic plan view of an example of the intersection region of the capacitor array according to Example 1. FIG. 21 is a schematic plan view of the capacitor array illustrated in FIG. 20 without the first sealing layer and the second sealing layer.

In the example illustrated in FIG. 20, the first through slit 15A and the second through slit 15B are orthogonal to each other.

As illustrated in FIG. 21, when the intersection region I of the first through slit 15A and the second through slit 15B is viewed in the thickness direction z, the intersection points (the four points in FIG. 21) of a first imaginary slit 115A obtained by extending the first through slit 15A to the intersection region I and a second imaginary slit 115B obtained by extending the second through slit 15B to the intersection region I are located inside the intersection region I (the circle in FIG. 21).

In other words, when the intersection region I is viewed in the thickness direction Z, the area of the intersection region I (the circle in FIG. 21) is larger than the area of the portion where the first imaginary slit 115A and the second imaginary slit 115B overlap each other (the quadrangle surrounded by the four points in FIG. 21).

As mentioned above, since the width of the first through slit 15A in the intersection region I is large in Example 1, it is possible to reduce the possibility of the occurrence of a short circuit defect between adjacent capacitor elements 30.

In addition, since the area of the intersection region I is large, and the area of the portion functioning as a prop connecting the front and back sealing layers is large, and the adhesion strength between the front and back is high. Thus, delamination can be reduced.

In the case in which the first sealing layer 25A and the second sealing layer 25B extend also in the intersection region I as illustrated in FIG. 20, the second sealing layer 25B is located further inside than the first sealing layer 25A in the intersection region I, and the area of the second sealing layer 25B in the intersection region I is the same as the area of the second imaginary slit 115B (see FIG. 21) in the intersection region I, when the intersection region I is viewed in the thickness direction Z.

As indicated by the dashed line in FIG. 20, it is preferable that at least one of the corner portions between the first through slit 15A and the intersection region I have a curved surface (a so-called round surface) or an obtuse angle surface. In this case, the stress concentrated at a corner portion in the intersection region I is relieved, and cracks and delamination can be reduced.

From the viewpoint of reducing cracks and delamination, it is more preferable that each of the corner portions between the first through slit 15A and the intersection region I have a curved surface or an obtuse angle surface. In the case in which two or more corner portions have curved surfaces or obtuse angle surfaces, all of the two or more corner portions may have curved surfaces, all of the two or more corner portions may have obtuse angle surfaces, or both types of corner portions, corner portions having curved surfaces and corner portions having obtuse angle surfaces, may be present together.

Similarly, it is preferable that at least one of the corner portions between the second through slit 15B and the intersection region I have a curved surface or an obtuse angle surface, and it is more preferable that each of the corner portions between the second through slit 15B and the intersection region I have a curved surface or an obtuse angle surface. In the case in which two or more corner portions have curved surfaces or obtuse angle surfaces, all of the two or more corner portions may have curved surfaces, all of the two or more corner portions may have obtuse angle surfaces, or both types of corner portions, corner portions having curved surfaces and corner portions having obtuse angle surfaces, may be present together.

In particular, it is preferable that at least one of the corner portions between the first through slit 15A and the intersection region I have a curved surface or an obtuse angle surface and that at least one of the corner portions between the second through slit 15B and the intersection region I have a curved surface or an obtuse angle surface, and it is more preferable that each of the corner portions between the first through slit 15A and the intersection region I have a curved surface or an obtuse angle surface and that each of the corner portions between the second through slit 15B and the intersection region I have a curved surface or an obtuse angle surface.

Figure 22:
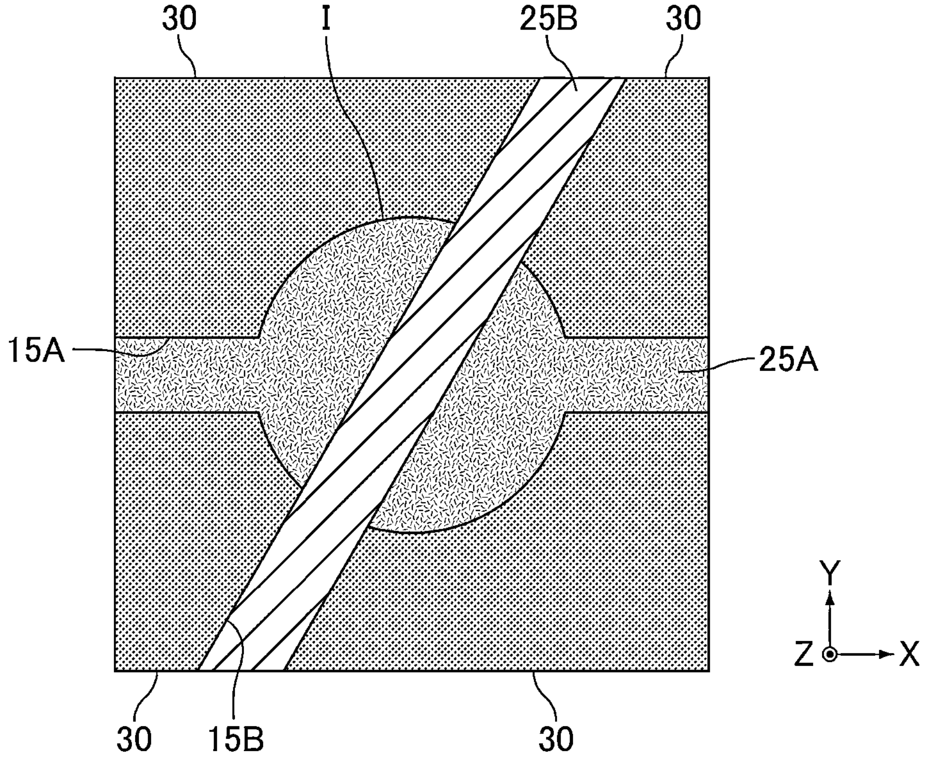
FIG. 22 is a schematic plan view of an intersection region of a first modification example in a capacitor array according to Example 1.
Figure 23:
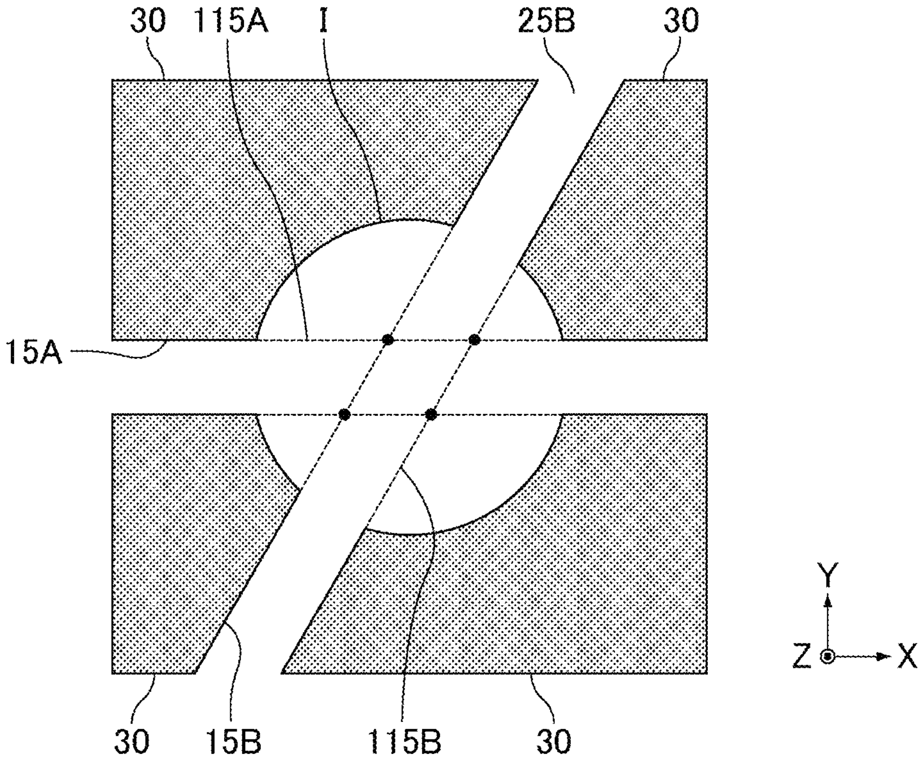
FIG. 23 is a schematic plan view of the capacitor array illustrated in FIG. 22 without the first sealing layer and the second sealing layer.

FIG. 22 is a schematic plan view of an intersection region of a first modification example in a capacitor array according to Example 1. FIG. 23 is a schematic plan view of the capacitor array illustrated in FIG. 22 without the first sealing layer and the second sealing layer.

As in the example illustrated in FIG. 22, the first through slit 15A and the second through slit 15B need not be orthogonal to each other and may intersect at an angle other than 90°.

As illustrated in FIG. 23, when the intersection region I of the first through slit 15A and the second through slit 15B is viewed in the thickness direction Z, the intersection points (the four points in FIG. 23) of a first imaginary slit 115A obtained by extending the first through slit 15A to the intersection region I and a second imaginary slit 115B obtained by extending the second through slit 15B to the intersection region I are located inside the intersection region I (the circle in FIG. 23).

Figure 24:
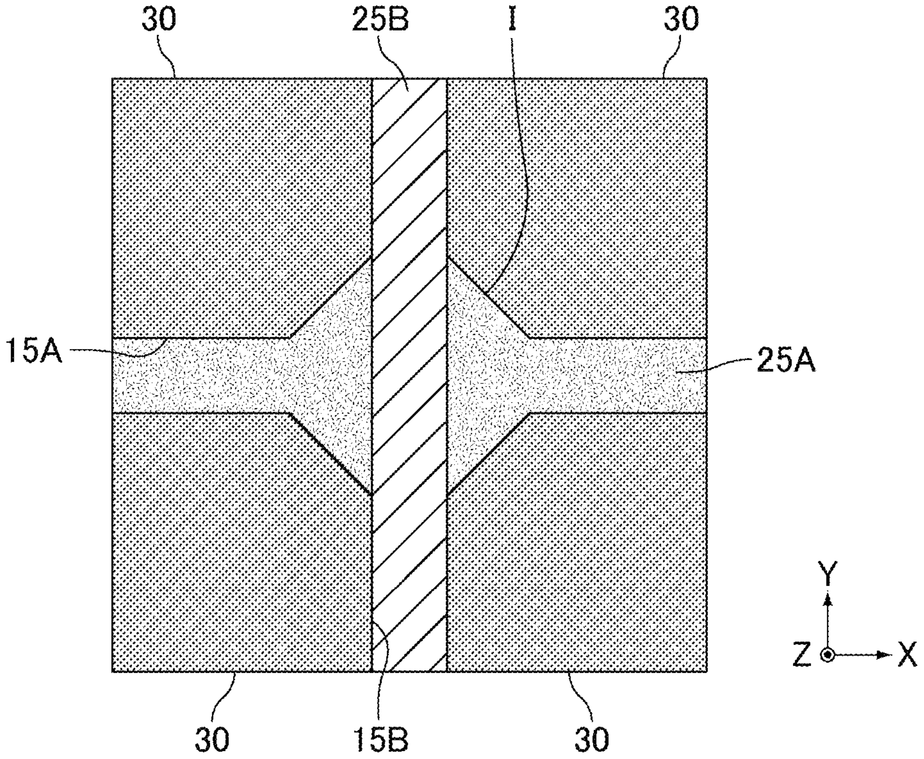
FIG. 24 is a schematic plan view of an intersection region of a second modification example in a capacitor array according to Example 1.

FIG. 24 is a schematic plan view of an intersection region of a second modification example in a capacitor array according to Example 1.

As in the example illustrated in FIG. 24, the planar shape of the intersection region I when viewed in the thickness direction Z may be a polygon such as a quadrangle.

The planar shape of the intersection region I when viewed in the thickness direction Z is not particularly limited and may be, for example, rectangles (squares or non-square rectangles); polygons such as quadrilaterals other than rectangles, triangles, pentagons, and hexagons; circles; ellipses; and combined shapes of some of these.

Figure 25:
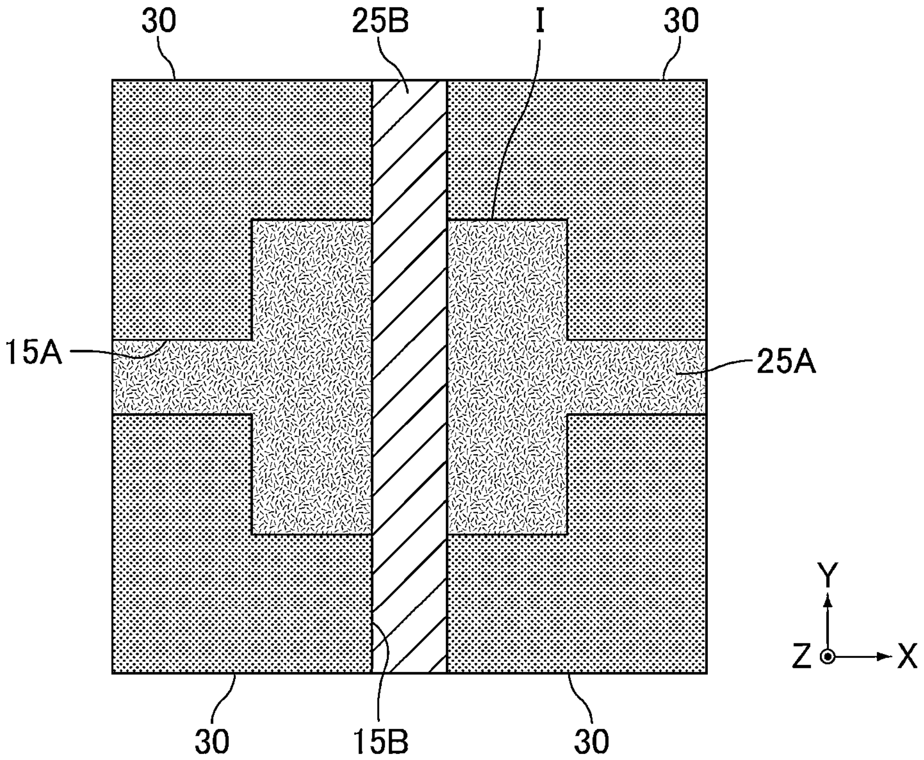
FIG. 25 is a schematic plan view of an intersection region of a third modification example in a capacitor array according to Example 1.

FIG. 25 is a schematic plan view of an intersection region of a third modification example in a capacitor array according to Example 1.

As in the example illustrated in FIG. 25, a configuration in which the corner portions between the first through slit 15A and the intersection region I do not have curved surfaces or obtuse angle surfaces is possible. Similarly, a configuration in which the corner portions between the second through slit 15B and the intersection region I do not have curved surfaces or obtuse angle surfaces is possible.

Figure 26:
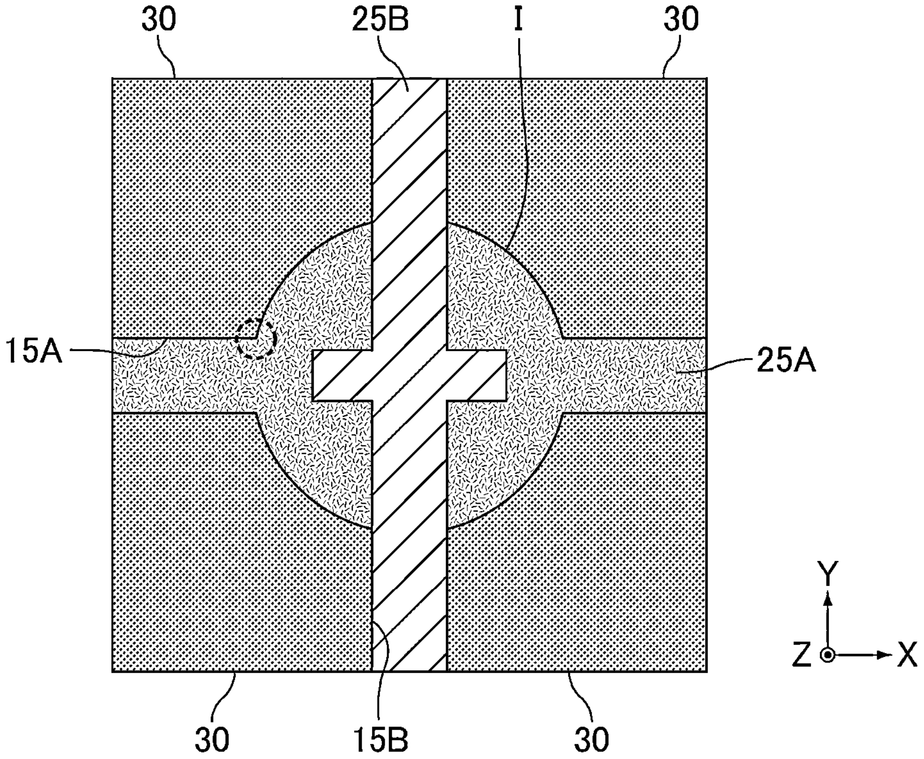
FIG. 26 is a schematic plan view of an example of an intersection region in a capacitor array according to Example 2.

FIG. 26 is a schematic plan view of an example of an intersection region in a capacitor array according to Example 2.

In the case in which the first sealing layer 25A and the second sealing layer 25B extend also in the intersection region I as illustrated in FIG. 26, the second sealing layer 25B is located further inside than the first sealing layer 25A in the intersection region I, and the area of the second sealing layer 25B in the intersection region I is larger than the area of the second imaginary slit 115B (see FIG. 21) in the intersection region I, when the intersection region I is viewed in the thickness direction Z. The other configuration is the same as or similar to that of Example 1.

As in the example illustrated in FIG. 26, the second sealing layer 25B includes a line-shaped portion along the first through slit 15A, in the intersection region I. The line-shaped portion of the second sealing layer 25B may be present on both the positive and negative sides in the first direction X or may be present on only one side in the first direction X.

As mentioned above, Example 2 makes it possible to further reduce the possibility of the occurrence of a short circuit defect between adjacent capacitor elements 30.

In addition, the contact area between the first sealing layer 25A and the second sealing layer 25B is larger than in Example 1, and hence, delamination between the first sealing layer 25A and the second sealing layer 25B can be reduced.

As indicated by the dashed line in FIG. 26, it is preferable that at least one of the corner portions between the first through slit 15A and the intersection region I have a curved surface or an obtuse angle surface, and it is more preferable that each of the corner portions between the first through slit 15A and the intersection region I have a curved surface or an obtuse angle surface. In the case in which two or more corner portions have curved surfaces or obtuse angle surfaces, all of the two or more corner portions may have curved surfaces, all of the two or more corner portions may have obtuse angle surfaces, or both types of corner portions, corner portions having curved surfaces and corner portions having obtuse angle surfaces, may be present together.

Similarly, it is preferable that at least one of the corner portions between the second through slit 15B and the intersection region I have a curved surface or an obtuse angle surface, and it is more preferable that each of the corner portions between the second through slit 15B and the intersection region I have a curved surface or an obtuse angle surface. In the case in which two or more corner portions have curved surfaces or obtuse angle surfaces, all of the two or more corner portions may have curved surfaces, all of the two or more corner portions may have obtuse angle surfaces, or both types of corner portions, corner portions having curved surfaces and corner portions having obtuse angle surfaces, may be present together.

In particular, it is preferable that at least one of the corner portions between the first through slit 15A and the intersection region I have a curved surface or an obtuse angle surface and that at least one of the corner portions between the second through slit 15B and the intersection region I have a curved surface or an obtuse angle surface, and it is more preferable that each of the corner portions between the first through slit 15A and the intersection region I have a curved surface or an obtuse angle surface and that each of the corner portions between the second through slit 15B and the intersection region I have a curved surface or an obtuse angle surface.

Although the first through slit 15A and the second through slit 15B are orthogonal to each other in the example illustrated in FIG. 26, the first through slit 15A and the second through slit 15B need not be orthogonal to each other and may intersect at an angle other than 90°.

Figure 27:
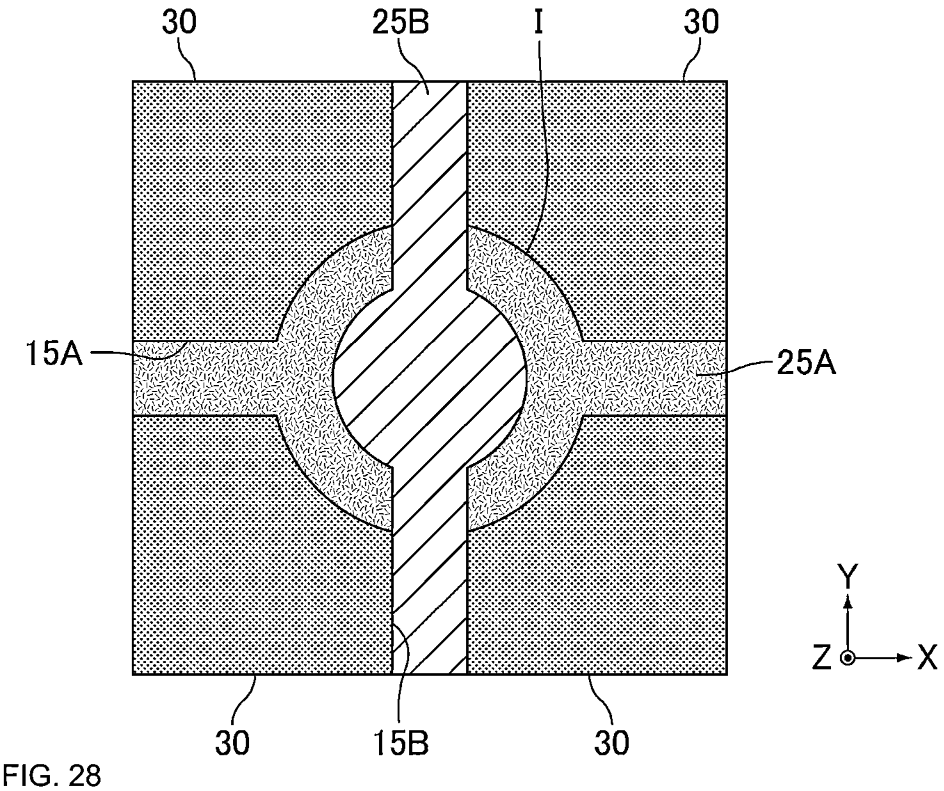
FIG. 27 is a schematic plan view of an intersection region of a first modification example in a capacitor array according to Example 2.

FIG. 27 is a schematic plan view of an intersection region of a first modification example in a capacitor array according to Example 2.

As in the example illustrated in FIG. 27, the second sealing layer 25B may include a circular portion or an elliptical portion in the intersection region I.

Figure 28:
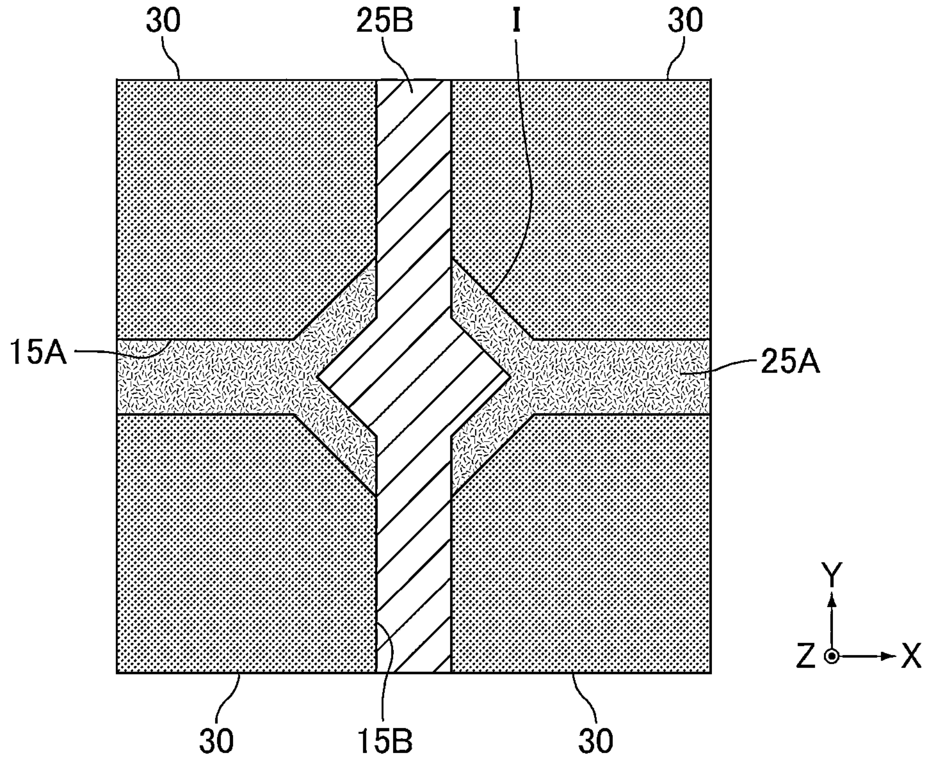
FIG. 28 is a schematic plan view of an intersection region of a second modification example in a capacitor array according to Example 2.

FIG. 28 is a schematic plan view of an intersection region of a second modification example in a capacitor array according to Example 2.

As in the example illustrated in FIG. 28, the planar shape of the intersection region I when viewed in the thickness direction Z may be a polygon such as a quadrangle.

In the example illustrated in FIG. 28, the second sealing layer 25B includes a polygonal portion such as a quadrangle in the intersection region I but may include a line-shaped portion or may include a circular portion or an elliptical portion.

Figure 29:
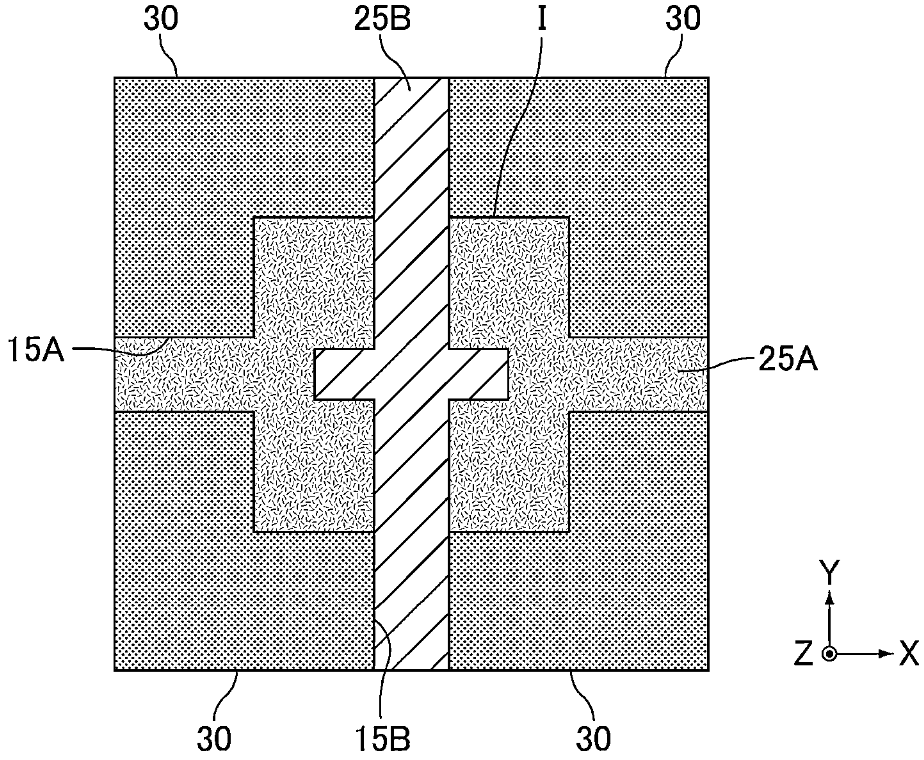
FIG. 29 is a schematic plan view of an intersection region of a third modification example in a capacitor array according to Example 2.

FIG. 29 is a schematic plan view of an intersection region of a third modification example in a capacitor array according to Example 2.

As in the example illustrated in FIG. 29, a configuration in which the corner portions between the first through slit 15A and the intersection region I do not have curved surfaces or obtuse angle surfaces is possible. Similarly, a configuration in which the corner portions between the second through slit 15B and the intersection region I do not have curved surfaces or obtuse angle surfaces is possible.

In the example illustrated in FIG. 29, the second sealing layer 25B includes a line-shaped portion in the intersection region I but may include a polygonal portion such as a quadrangle or may include a circular portion or an elliptical portion.

Figure 30:
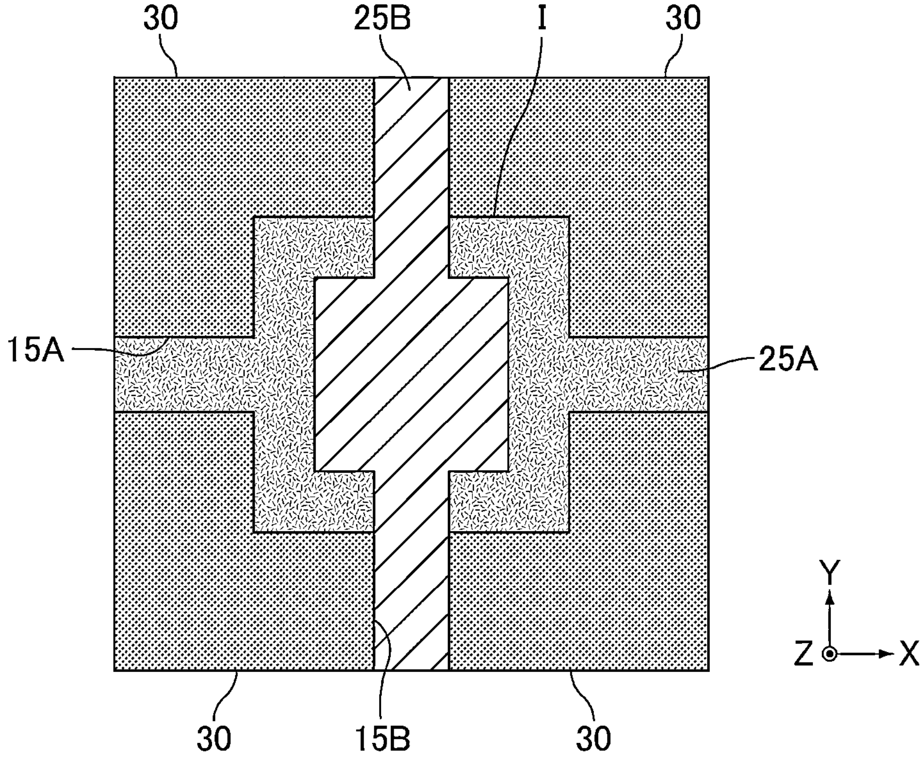
FIG. 30 is a schematic plan view of an intersection region of a fourth modification example in a capacitor array according to Example 2.

FIG. 30 is a schematic plan view of an intersection region of a fourth modification example in a capacitor array according to Example 2.

As in the example illustrated in FIG. 30, the width of the line-shaped portion of the second sealing layer 25B may be larger than the width of the first through slit 15A.

The following describes an example of a structure that enables the first electrode layer and the second electrode layer of the capacitor element to be extended to the outside in the capacitor array of the present disclosure.

The capacitor array 1 illustrated in FIG. 1 preferably further includes through-hole conductors 60.

It is preferable that the through-hole conductors 60 include at least one of a first through-hole conductor 62 electrically connected to the first electrode layer (for example, the anode plate 31) of the capacitor element 30 and a second through-hole conductor 64 electrically connected to the second electrode layer (for example, the cathode layer 36) of the capacitor element 30.

The through-hole conductors 60, more specifically, the first through-hole conductor 62 and the second through-hole conductor 64 each preferably pass through the capacitor element 30 in the thickness direction Z of the capacitor layer 10.

The anode plate 31 and the cathode layers 36 of the capacitor element 30 are extended to the outside by using the first through-hole conductor 62 and the second through-hole conductor 64, respectively.

First, an example of the structure that enables the anode plate 31 of the capacitor element 30 to be extended to the outside will be described below.

Figure 31:
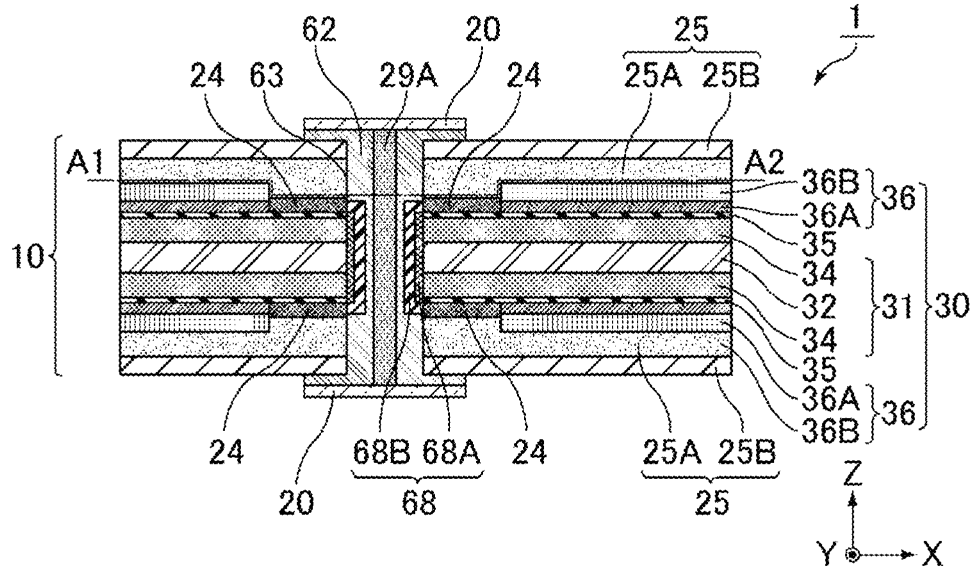
FIG. 31 is a schematic sectional view of an example of a cross section of the capacitor array including the cross section taken along line segment A1-A2 in FIG. 1.

FIG. 31 is a schematic sectional view of an example of a cross section of the capacitor array including the cross section taken along line segment A1-A2 in FIG. 1. Line segment A1-A2 in FIG. 31 corresponds to line segment A1-A2 in FIG. 1.

As illustrated in FIG. 31, the first through-hole conductor 62 preferably passes through the capacitor element 30 in the thickness direction Z of the capacitor layer 10. More specifically, the first through-hole conductor 62 is preferably located at least on the inner wall surface of a first through hole 63 extending through the capacitor element 30 in the thickness direction Z.

The first through-hole conductor 62 is preferably electrically connected to the end surface of the anode plate 31 facing the inner wall surface of the first through hole 63 in the plane directions orthogonal to the thickness direction Z.

The plane directions include the first direction X and the second direction Y orthogonal to the thickness direction Z.

It is preferable that the core portion 32 and the porous portions 34 be exposed on the end surface of the anode plate 31 electrically connected to the first through-hole conductor 62. In this case, not only the core portion 32 but also the porous portions 34 are electrically connected to the first through-hole conductor 62.

The first through-hole conductor 62 is formed, for example, as follows: First, a first through hole 63 is formed by performing drilling, laser processing, or the like on the portion at which a first through-hole conductor 62 is to be formed. Then, the first through-hole conductor 62 is formed by metallizing the inner wall surface of the first through hole 63 with a low resistance metal such as copper, gold, and silver. When forming the first through-hole conductor 62, for example, metallizing the inner wall surface of the first through hole 63 by electroless copper plating, electrolytic copper plating, or the like makes the processing easy. Instead of the method in which the inner wall surface of the first through hole 63 is metallized, the method of forming the first through-hole conductor 62 may also be a method in which the first through hole 63 is filled with a metal material, a composite material containing a metal and a resin, or the like.

As illustrated in FIG. 31, the capacitor array 1 preferably further includes an anode connection layer 68 located between the first through-hole conductor 62 and the end surface of the anode plate 31. In the example illustrated in FIG. 31, the anode connection layer 68 is in contact with both the first through-hole conductor 62 and the end surface of the anode plate 31.

Since the anode connection layer 68 is located between the first through-hole conductor 62 and the end surface of the anode plate 31, the anode connection layer 68 functions as a barrier layer for the anode plate 31, more specifically, a barrier layer for the core portion 32 and the porous portions 34. Use of the anode connection layer 68 mentioned above reduces dissolution of the anode plate 31 that occurs during a chemical treatment to form conductive portions 20 described later and the like, in other words, infiltration of chemicals into the capacitor element 30 is reduced. This makes it easier to improve the reliability of the capacitor array 1.

As illustrated in FIG. 31, the first through-hole conductor 62 and the end surface of the anode plate 31 are preferably electrically connected to each other with the anode connection layer 68 interposed therebetween.

As illustrated in FIG. 31, the anode connection layer 68 may include a first anode connection layer 68A and a second anode connection layer 68B in this order from the end surface of the anode plate 31.

In the anode connection layer 68, for example, the first anode connection layer 68A may contain zinc as the main component, and the second anode connection layer 68B may contain nickel or copper as the main component. In this case, the first anode connection layer 68A is formed on the end surface of the anode plate 31, for example, by depositing zinc by displacement through a zincate treatment. After that, the second anode connection layer 68B is formed on the surface of the first anode connection layer 68A, for example, by electroless nickel plating or electroless copper plating. Note that the first anode connection layer 68A may disappear in some cases when the second anode connection layer 68B is formed. In this case, the anode connection layer 68 may include only the second anode connection layer 68B.

It is preferable that the anode connection layer 68 include a layer containing nickel as the main component. In this case, damage to the metal (for example, aluminum) and the like composing the anode plate 31 is reduced, and this makes it easy to improve the barrier property of the anode connection layer 68 for the anode plate 31.

As illustrated in FIG. 31, in the thickness direction Z, the dimension of the anode connection layer 68 is preferably larger than the dimension of the anode plate 31. In this case, since the entire end surface of the anode plate 31 is covered with the anode connection layer 68, the barrier property of the anode connection layer 68 for the anode plate 31 is more likely to be high.

It is preferable that the dimension of the anode connection layer 68 be larger than 100% and smaller than or equal to 200% of the dimension of the anode plate 31 in the thickness direction Z.

In the thickness direction Z, the dimension of the anode connection layer 68 may be the same as or smaller than the dimension of the anode plate 31.

Note that a configuration without the anode connection layer 68 between the first through-hole conductor 62 and the end surface of the anode plate 31 is also possible. In this case, the first through-hole conductor 62 may be directly connected to the end surface of the anode plate 31.

As illustrated in FIGS. 1 and 31, it is preferable that the first through-hole conductor 62 be electrically connected to the end surface of the anode plate 31 over the entire circumference of the first through hole 63 when viewed in the thickness direction Z. As illustrated in FIG. 31, in the case in which the anode connection layer 68 is located between the first through-hole conductor 62 and the end surface of the anode plate 31, it is preferable that the first through-hole conductor 62 be connected to the anode connection layer 68 over the entire circumference of the first through hole 63 when viewed in the thickness direction Z. In this case, the contact area between the first through-hole conductor 62 and the anode connection layer 68 is large, and thus the connection resistance between the first through-hole conductor 62 and the anode connection layer 68 is more likely to be low. Hence, the connection resistance between the first through-hole conductor 62 and the anode plate 31 is more likely to be low, and thus the equivalent series resistance (ESR) of the capacitor element 30 is more likely to be low. In addition, because the adhesion between the first through-hole conductor 62 and the anode connection layer 68 is more likely to be high, defects such as separation between the first through-hole conductor 62 and the anode connection layer 68 due to thermal stress are less likely to occur.

As illustrated in FIG. 31, the capacitor array 1 preferably further includes conductive portions 20 electrically connected to the first through-hole conductor 62. In the example illustrated in FIG. 31, the conductive portions 20 are located on the surfaces of the first through-hole conductor 62. The conductive portions 20 can function as connection terminals of the capacitor array 1 (the capacitor element 30).

Examples of the constituent material of the conductive portion 20 include low resistance metals such as silver, gold, and copper. In this case, the conductive portions 20 are formed, for example, by plating the surfaces of the first through-hole conductor 62.

To improve the adhesion between the conductive portions 20 and another member, in this case, the adhesion between the conductive portions 20 and the first through-hole conductor 62, the constituent material of the conductive portion 20 may be mixed materials of a resin and at least one kind of conductive fillers selected from the group of silver fillers, copper fillers, nickel fillers, and carbon fillers.

As illustrated in FIGS. 1 and 31, the capacitor array 1 preferably further includes a first resin-filled portion 29A formed by filling the first through hole 63 with a resin material. In the examples illustrated in FIGS. 1 and 31, the first resin-filled portion 29A is located in the space surrounded by the first through-hole conductor 62 on the inner wall surface of the first through hole 63. Since the presence of the first resin-filled portion 29A eliminates the space in the first through hole 63, it reduces the occurrence of delamination of the first through-hole conductor 62.

It is preferable that the coefficient of thermal expansion of the first resin-filled portion 29A be higher than the coefficient of thermal expansion of the first through-hole conductor 62. More specifically, it is preferable that the coefficient of thermal expansion of the resin material placed in the first through hole 63 be higher than the coefficient of thermal expansion of the constituent material of the first through-hole conductor 62 (for example, copper). In this case, the first resin-filled portion 29A, more specifically, the resin material placed in the first through hole 63, expands under high temperature environment, and the first through-hole conductor 62 is pressed from the inside toward the outside of the first through hole 63 against the inner wall surface of the first through hole 63. This sufficiently reduces the occurrence of delamination of the first through-hole conductor 62.

The coefficient of thermal expansion of the first resin-filled portion 29A may be the same as or lower than the coefficient of thermal expansion of the first through-hole conductor 62. More specifically, the coefficient of thermal expansion of the resin material placed in the first through hole 63 may be the same as or lower than the coefficient of thermal expansion of the constituent material of the first through-hole conductor 62.

The capacitor array 1 may have a configuration without the first resin-filled portion 29A. In this case, it is preferable that the first through-hole conductor 62 be located not only on the inner wall surface of the first through hole 63 but throughout the entire inside of the first through hole 63.

The following describes an example of the structure that enables the cathode layers 36 of the capacitor element 30 to be extended to the outside.

Figure 32:
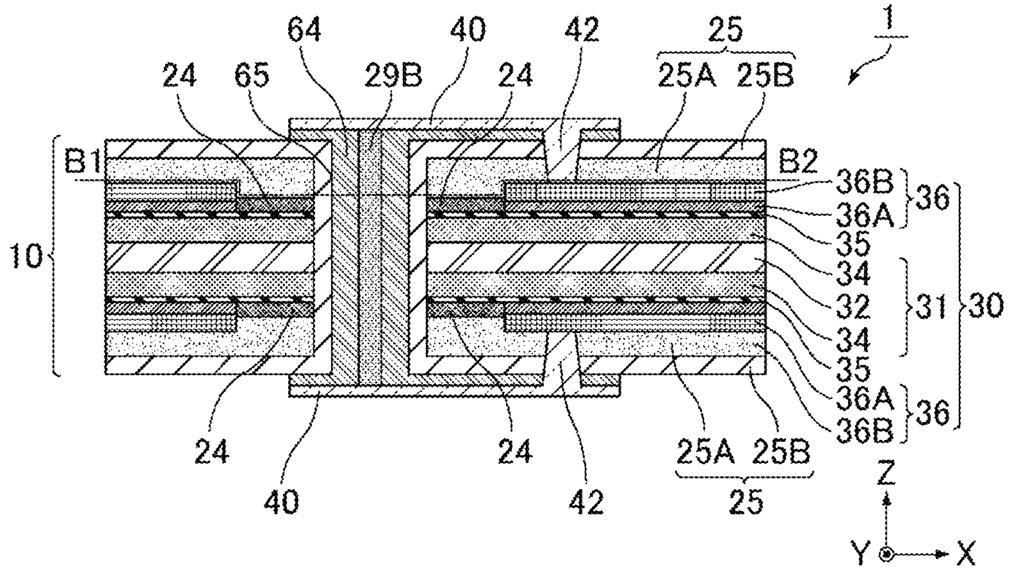
FIG. 32 is a schematic sectional view of an example of a cross section of the capacitor array including the cross section taken along line segment B1-B2 in FIG. 1.

FIG. 32 is a schematic sectional view of an example of a cross section of the capacitor array including the cross section taken along line segment B1-B2 in FIG. 1. Line segment B1-B2 in FIG. 32 corresponds to line segment B1-B2 in FIG. 1.

As illustrated in FIG. 32, the second through-hole conductor 64 preferably passes through the capacitor element 30 in the thickness direction Z of the capacitor layer 10. More specifically, the second through-hole conductor 64 is preferably located at least on the inner wall surface of a second through hole 65 extending in the thickness direction Z through the capacitor element 30 having the first through-hole conductor 62 illustrated in FIG. 31 and other figures.

As illustrated in FIG. 32, the second through-hole conductor 64 is preferably electrically connected to the cathode layers 36. In the example illustrated in FIG. 32, conductive portions 40 are located on the surfaces of the second through-hole conductor 64 and are configured to function as connection terminals of the capacitor array 1 (the capacitor element 30). In the example illustrated in FIG. 32, via conductors 42 are provided to pass through the sealing layer 25 in the thickness direction Z and be connected to the conductive portions 40 and the cathode layers 36. Hence, in the example illustrated in FIG. 32, the second through-hole conductor 64 is electrically connected to the cathode layers 36 with the conductive portions 40 and the via conductors 42 interposed therebetween. In this case, the size of the capacitor array 1 can be reduced.

The second through-hole conductor 64 is formed, for example, as follows: First, a through hole is formed by performing drilling, laser processing, or the like on the portion at which a second through-hole conductor 64 is to be formed. Next, the formed through hole is filled with the constituent material (for example, a resin material) of the second sealing layer 25B to form an insulation layer. Then, the second through hole 65 is formed by performing drilling, laser processing, or the like on the formed insulation layer. In this process, the diameter of the second through hole 65 is set to be smaller than the diameter of the insulation layer, so that the constituent material of the second sealing layer 25B remains between the previously formed through hole and the second through hole 65. After that, the inner wall surface of the second through hole 65 is metallized with a low resistance metal such as copper, gold, and silver to form the second through-hole conductor 64. When forming the second through-hole conductor 64, for example, metallizing the inner wall surface of the second through hole 65 by electroless copper plating, electrolytic copper plating, or the like makes the processing easy. Instead of the method in which the inner wall surface of the second through hole 65 is metallized, the method of forming the second through-hole conductor 64 may be a method in which the second through hole 65 is filled with a metal material, a composite material containing a metal and a resin, or the like.

Examples of the constituent material of the conductive portion 40 include low resistance metals such as silver, gold, and copper. In this case, the conductive portions 40 are formed, for example, by plating the surfaces of the second through-hole conductor 64.

To improve the adhesion between the conductive portions 40 and another member, in this case, the adhesion between the conductive portions 40 and the second through-hole conductor 64, the constituent material of the conductive portion 40 may be mixed materials of a resin and at least one kind of conductive fillers selected from the group of silver fillers, copper fillers, nickel fillers, and carbon fillers.

Examples of the constituent material of the via conductor 42 may be the same as or similar to the constituent material of the conductive portion 40.

The via conductor 42 is formed, for example, by plating the inner wall surface of a through hole extending through the sealing layer 25 in the thickness direction Z or filling the through hole with a conductive paste and then performing a heat treatment.

As illustrated in FIGS. 1 and 32, the capacitor array 1 preferably further includes a second resin-filled portion 29B formed by filling the second through hole 65 with a resin material. In the example illustrated in FIGS. 1 and 32, the second resin-filled portion 29B is located in the space surrounded by the second through-hole conductor 64 on the inner wall surface of the second through hole 65. Since the presence of the second resin-filled portion 29B eliminates the space in the second through hole 65, it reduces the occurrence of delamination of the second through-hole conductor 64.

It is preferable that the coefficient of thermal expansion of the second resin-filled portion 29B be higher than the coefficient of thermal expansion of the second through-hole conductor 64. More specifically, it is preferable that the coefficient of thermal expansion of the resin material placed in the second through hole 65 be higher than the coefficient of thermal expansion of the constituent material of the second through-hole conductor 64 (for example, copper). In this case, the second resin-filled portion 29B, more specifically, the resin material placed in the second through hole 65, expands under high temperature environment, and the second through-hole conductor 64 is pressed from the inside toward the outside of the second through hole 65 against the inner wall surface of the second through hole 65. This sufficiently reduces the occurrence of delamination of the second through-hole conductor 64.

The coefficient of thermal expansion of the second resin-filled portion 29B may be the same as or lower than the coefficient of thermal expansion of the second through-hole conductor 64. More specifically, the coefficient of thermal expansion of the resin material placed in the second through hole 65 may be the same as or lower than the coefficient of thermal expansion of the constituent material of the second through-hole conductor 64.

The capacitor array 1 may have a configuration without the second resin-filled portion 29B. In this case, it is preferable that the second through-hole conductor 64 be located not only on the inner wall surface of the second through hole 65 but throughout the entire inside of the second through hole 65.

As illustrated in FIG. 32, the second sealing layer 25B preferably extends between the anode plate 31 and the second through-hole conductor 64. In the example illustrated in FIG. 32, the second sealing layer 25B is in contact with both the anode plate 31 and the second through-hole conductor 64. Since the second sealing layer 25B extends between the anode plate 31 and the second through-hole conductor 64, the insulation between the anode plate 31 and the second through-hole conductor 64, in other words, the insulation between the anode plate 31 and the cathode layers 36, is sufficiently achieved, which prevents a short circuit between them.

In the case in which the second sealing layer 25B extends between the anode plate 31 and the second through-hole conductor 64, it is preferable that the core portion 32 and the porous portions 34 be exposed on the end surface of the anode plate 31 in contact with the second sealing layer 25B as illustrated in FIG. 32. In this case, the contact area between the second sealing layer 25B and the porous portions 34 is large, improving the adhesion between them, so that defects such as separation between the second sealing layer 25B and the porous portions 34 are less likely to occur.

In the case in which the core portion 32 and the porous portions 34 are exposed on the end surface of the anode plate 31 in contact with the second sealing layer 25B, it is preferable that the insulation layers 24 formed to extend inside the porous portions 34 by the constituent material of the insulation layers 24 infiltrating into the pores of the porous portions 34 be located around the second through-hole conductor 64. In this case, the insulation between the anode plate 31 and the second through-hole conductor 64, in other words, the insulation between the anode plate 31 and the cathode layers 36, is sufficiently achieved, which sufficiently prevents a short circuit between them.

In the case in which the core portion 32 and the porous portions 34 are exposed on the end surface of the anode plate 31 in contact with the second sealing layer 25B, it is preferable that the constituent material of the second sealing layer 25B be infiltrated into the pores of the porous portions 34. This improves the mechanical strength of the porous portions 34, reducing the occurrence of delamination resulting from the pores of the porous portions 34.

It is preferable that the coefficient of thermal expansion of the second sealing layer 25B be higher than the coefficient of thermal expansion of the second through-hole conductor 64. More specifically, it is preferable that the coefficient of thermal expansion of the constituent material of the second sealing layer 25B be higher than the coefficient of thermal expansion of the constituent material of the second through-hole conductor 64 (for example, copper). In this case, the second sealing layer 25B, more specifically, the constituent material of the second sealing layer 25B, expands under high temperature environment, pressing the porous portions 34 and the second through-hole conductor 64. This sufficiently reduces the occurrence of delamination.

The coefficient of thermal expansion of the second sealing layer 25B may be the same as or lower than the coefficient of thermal expansion of the second through-hole conductor 64. More specifically, the coefficient of thermal expansion of the constituent material of the second sealing layer 25B may be the same as or lower than the coefficient of thermal expansion of the constituent material of the second through-hole conductor 64.

Although not illustrated in FIG. 1 and other figures, the through-hole conductors 60 may include a third through-hole conductor not electrically connected to the first electrode layer (for example, the anode plate 31) and the second electrode layer (for example, the cathode layers 36) of the capacitor element 30.

The capacitor array of the present disclosure is not limited to the embodiments described above as long as, when the intersection region of the first through slit and the second through slit is viewed in in the thickness direction, the intersection points of the first imaginary slit obtained by extending the first through slit to the intersection region and the second imaginary slit obtained by extending the second through slit to the intersection region are inside the intersection region. Hence, various applications and modifications can be made in terms of the configuration, the manufacturing conditions, and the like of the capacitor array within the scope of the present disclosure.

In the capacitor array of the present disclosure, the capacitor elements are not limited to electrolytic capacitors such as solid electrolytic capacitors. In the capacitor array of the present disclosure, the capacitor elements may be configured as, for example, ceramic capacitors containing barium titanate; thin film capacitors containing silicon nitride (SiN), silicon dioxide ($SiO_2$), hydrogen fluoride (HF), or the like; trench capacitors having a metal-insulator-metal (MIM) structure; or the like.

In the capacitor array of the present disclosure, to make the capacitor layer thinner and larger in area and to improve the mechanical properties of the capacitor layer such as rigidity and flexibility, it is preferable that the capacitor elements be configured as capacitors having a base material composed of a metal such as aluminum, and it is more preferable that the capacitor portions be configured as electrolytic capacitors having a base material composed of a metal such as aluminum.

The capacitor array of the present disclosure is used, for example, in a composite electronic component. Such a composite electronic component includes, for example, a capacitor array of the present disclosure and an electronic component electrically connected to outer electrode layers of the capacitor array of the present disclosure.

In the composite electronic component, the electronic component electrically connected to outer electrode layers may be a passive element, an active element, both passive and active elements, or a composite of passive and active elements.

Examples of the passive element include an inductor.

Examples of the active element include a memory, a graphical processing unit (GPU), a central processing unit (CPU), a micro processing unit (MPU), and a power management IC (PMIC).

When the capacitor array of the present disclosure is used in a composite electronic component, the capacitor array of the present disclosure is used, for example, as a substrate for mounting an electronic component. Hence, the capacitor array of the present disclosure is formed as a sheet as a whole, and an electronic component to be mounted on the capacitor array of the present disclosure is formed as a sheet, so that the capacitor array of the present disclosure and the electronic component can be electrically connected in the thickness direction with through-hole conductors passing through the electronic component in the thickness direction interposed therebetween. This makes it possible to form a module including a passive element and an active element, which are electronic components, all together.

For example, a switching regulator can be formed by electrically connecting a capacitor array of the present disclosure between a voltage regulator including a semiconductor active element and a load to which a direct current voltage generated by conversion is supplied.

In a composite electronic component, a circuit layer may be formed on one main surface of a capacitor matrix sheet in which capacitor arrays of the present disclosure are laid out, and the circuit layer may be electrically connected to a passive element or an active element which is an electronic component.

Alternatively, a capacitor array of the present disclosure is placed in a cavity portion formed in advance in a substrate and is covered by a resin. Then, a circuit layer may be formed on the resin. A passive element or an active element, which is another electronic component, may be mounted in another cavity portion in the same substrate.

Alternatively, a capacitor array of the present disclosure is mounted on a smooth carrier such as a wafer or a glass. An outer layer portion is formed by using a resin, and then a circuit layer is formed. The circuit layer may be electrically connected to a passive element or an active element which is an electronic component.

The present specification discloses the following.

<1> A capacitor array including: a capacitor layer including a plurality of capacitor elements, each of the plurality of capacitor elements includes a first electrode layer, a second electrode layer, and a dielectric layer, the first electrode layer and the second electrode layer facing each other in the thickness direction with the dielectric layer interposed therebetween; a first through slit extending in a first direction and arranged in a plane direction orthogonal to a thickness direction; and a second through slit extending in a second direction intersecting the first direction and arranged in the plane direction orthogonal to the thickness direction, wherein the first through slit and the second through slit separate the plurality of capacitor elements from each other, and when an intersection region of the first through slit and the second through slit is viewed in the thickness direction, intersection points of a first imaginary slit obtained by extending the first through slit to the intersection region and a second imaginary slit obtained by extending the second through slit to the intersection region are located inside the intersection region.

<2> The capacitor array according to <1>, further including a sealing layer sealing the capacitor layer.

<3> The capacitor array according to <2>, in which the sealing layer includes a first sealing layer on two main surfaces of the capacitor layer opposed to each other in the thickness direction, and the first sealing layer extends into the first through slit, and the first sealing layer does not extend into the second through slit.

<4> The capacitor array according to <3>, in which the sealing layer further includes a second sealing layer on a surface of the first sealing layer, and the second sealing layer does not extend into the first through slit and the second sealing layer extends into the second through slit.

<5> The capacitor array according to <4>, in which the first sealing layer and the second sealing layer extend into the intersection region, and when the intersection region is viewed in the thickness direction, the second sealing layer is located further inside the intersection region than the first sealing layer, and an area of the second sealing layer in the intersection region is larger than an area of the second imaginary slit in the intersection region.

<6> The capacitor array according to any one of <1> to <5>, in which at least one of corner portions between the first through slit and the intersection region has a curved surface or an obtuse angle surface.

<7> The capacitor array according to any one of <1> to <5>, in which each of corner portions between the first through slit and the intersection region has a curved surface or an obtuse angle surface.

<8> The capacitor array according to any one of <1> to <5>, in which at least one of corner portions between the second through slit and the intersection region has a curved surface or an obtuse angle surface.

<9> The capacitor array according to any one of <1> to <5>, in which each of corner portions between the second through slit and the intersection region has a curved surface or an obtuse angle surface.

<10> The capacitor array according to any one of <1> to <5>, in which at least one of corner portions between the first through slit and the intersection region has a curved surface or an obtuse angle surface, and at least one of corner portions between the second through slit and the intersection region has a curved surface or an obtuse angle surface.

<11> The capacitor array according to any one of <1> to <5>, in which each of corner portions between the first through slit and the intersection region has a curved surface or an obtuse angle surface, and each of corner portions between the second through slit and the intersection region has a curved surface or an obtuse angle surface.

<12> The capacitor array according to any one of <1> to <11>, in which the first electrode layer is an anode plate including a core portion composed of a metal and a porous portion on at least one main surface of the core portion, the dielectric layer is on a surface of the porous portion, and the second electrode layer is a cathode layer on a surface of the dielectric layer.

<13> The capacitor array according to <12>, in which the cathode layer includes a solid electrolyte layer located on the surface of the dielectric layer.

REFERENCE SIGNS LIST

1 CAPACITOR ARRAY
10 CAPACITOR LAYER

15 THROUGH SLIT
15A FIRST THROUGH SLIT
15B SECOND THROUGH SLIT
20 CONDUCTIVE PORTION
24 INSULATION LAYER
25 SEALING LAYER
25A FIRST SEALING LAYER
25B SECOND SEALING LAYER
29A FIRST RESIN-FILLED PORTION
29B SECOND RESIN-FILLED PORTION
30 CAPACITOR ELEMENT
30*a* FIRST MAIN SURFACE OF CAPACITOR ELEMENT
30*b* SECOND MAIN SURFACE OF CAPACITOR ELEMENT
31 ANODE PLATE
32 CORE PORTION
34 POROUS PORTION
35 DIELECTRIC LAYER
36 CATHODE LAYER
36A SOLID ELECTROLYTE LAYER
36B CONDUCTOR LAYER
40 CONDUCTIVE PORTION
42 VIA CONDUCTOR
60 THROUGH-HOLE CONDUCTOR
62 FIRST THROUGH-HOLE CONDUCTOR
63 FIRST THROUGH HOLE
64 SECOND THROUGH-HOLE CONDUCTOR
65 SECOND THROUGH HOLE
68 ANODE CONNECTION LAYER
68A FIRST ANODE CONNECTION LAYER
68B SECOND ANODE CONNECTION LAYER
115A FIRST IMAGINARY SLIT
115B SECOND IMAGINARY SLIT
130 CAPACITOR SHEET
130*a* FIRST MAIN SURFACE OF CAPACITOR SHEET
130*b* SECOND MAIN SURFACE OF CAPACITOR SHEET
I INTERSECTION REGION OF FIRST THROUGH SLIT AND SECOND THROUGH SLIT
W1 WIDTH OF FIRST THROUGH SLIT
W2 WIDTH OF SECOND THROUGH SLIT
X FIRST DIRECTION
Y SECOND DIRECTION
Z THICKNESS DIRECTION

The invention claimed is:

1. A capacitor array comprising a capacitor layer including a plurality of capacitor elements, each of the plurality of capacitor elements includes a first electrode layer, a second electrode layer, and a dielectric layer, the first electrode layer and the second electrode layer facing each other in the thickness direction with the dielectric layer interposed therebetween;

a first through slit extending in a first direction and arranged in a plane direction orthogonal to a thickness direction; and a second through slit extending in a second direction intersecting the first direction and arranged in the plane direction orthogonal to the thickness direction, wherein the first through slit and the second through slit separate the plurality of capacitor elements from each other, and when an intersection region of the first through slit and the second through slit is viewed in the thickness direction, intersection points of a first imaginary slit obtained by extending the first through slit to the intersection region and a second imaginary slit obtained by extending the second through slit to the intersection region are located inside the intersection region.

2. The capacitor array according to claim 1, further comprising a sealing layer sealing the capacitor layer.

3. The capacitor array according to claim 2, wherein the sealing layer includes a first sealing layer on two main surfaces of the capacitor layer opposed to each other in the thickness direction, and the first sealing layer extends into the first through slit, and the first sealing layer does not extend into the second through slit.

4. The capacitor array according to claim 3, wherein the sealing layer further includes a second sealing layer on a surface of the first sealing layer, and the second sealing layer does not extend into the first through slit and the second sealing layer extends into the second through slit.

5. The capacitor array according to claim 4, wherein the first sealing layer and the second sealing layer extend into the intersection region, and when the intersection region is viewed in the thickness direction, the second sealing layer is located further inside the intersection region than the first sealing layer, and an area of the second sealing layer in the intersection region is larger than an area of the second imaginary slit in the intersection region.

6. The capacitor array according to claim 4, wherein the second sealing layer includes, in the intersection region, at least one of a line-shaped portion extending along the first through slit, a circular portion or an elliptical portion, or a polygon portion.

7. The capacitor array according to claim 1, wherein at least one of corner portions between the first through slit and the intersection region has a curved surface or an obtuse angle surface.

8. The capacitor array according to claim 1, wherein each of corner portions between the first through slit and the intersection region has a curved surface or an obtuse angle surface.

9. The capacitor array according to claim 1, wherein at least one of corner portions between the second through slit and the intersection region has a curved surface or an obtuse angle surface.

10. The capacitor array according to claim 1, wherein each of corner portions between the second through slit and the intersection region has a curved surface or an obtuse angle surface.

11. The capacitor array according to claim 1, wherein at least one of corner portions between the first through slit and the intersection region has a curved surface or an obtuse angle surface, and at least one of corner portions between the second through slit and the intersection region has a curved surface or an obtuse angle surface.

12. The capacitor array according to claim 1, wherein each of corner portions between the first through slit and the intersection region has a curved surface or an obtuse angle surface, and each of corner portions between the second through slit and the intersection region has a curved surface or an obtuse angle surface.

13. The capacitor array according to claim 1, wherein the first electrode layer is an anode plate including a core portion composed of a metal and a porous portion on at least one main surface of the core portion, the dielectric layer is on a surface of the porous portion, and the second electrode layer is a cathode layer on a surface of the dielectric layer.

14. The capacitor array according to claim 13, wherein the cathode layer includes a solid electrolyte layer on the surface of the dielectric layer.

15. The capacitor array according to claim 1, wherein the first direction and the second direction are orthogonal to each other.

16. The capacitor array according to claim 1, wherein a width of the first through slit is uniform in the thickness direction.

17. The capacitor array according to claim 16, wherein a width of the second through slit is uniform in the thickness direction.

18. The capacitor array according to claim 1, wherein a width of the second through slit is uniform in the thickness direction.

* * * * *